United States Patent
Zhao et al.

(10) Patent No.: US 12,499,460 B2
(45) Date of Patent: Dec. 16, 2025

(54) INFORMATION DELIVERY METHOD, APPARATUS, AND DEVICE, AND COMPUTER-READABLE STORAGE MEDIUM

(71) Applicant: Tencent Technology (Shenzhen) Company Limited, Shenzhen (CN)

(72) Inventors: Xiaoxi Zhao, Shenzhen (CN); Jianquan Liang, Shenzhen (CN); Dongqing Huang, Shenzhen (CN); Shuai Shao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 700 days.

(21) Appl. No.: 17/740,307

(22) Filed: May 9, 2022

(65) Prior Publication Data

US 2022/0270122 A1 Aug. 25, 2022

Related U.S. Application Data

(63) Continuation of application No. PCT/CN2021/095669, filed on May 25, 2021.

(30) Foreign Application Priority Data

Jun. 17, 2020 (CN) .......................... 202010553240.X

(51) Int. Cl.
   *G06Q 30/00* (2023.01)
   *G06Q 30/0201* (2023.01)
(52) U.S. Cl.
   CPC ..... *G06Q 30/0206* (2013.01); *G06Q 30/0201* (2013.01)

(58) Field of Classification Search
   CPC .............. G06Q 30/0206; G06Q 30/0201
   See application file for complete search history.

(56) References Cited

U.S. PATENT DOCUMENTS

| | | | |
|---|---|---|---|
| 2007/0156515 A1* | 7/2007 | Hasselback | G06Q 30/02 705/14.27 |
| 2009/0222303 A1* | 9/2009 | Higgins | G06Q 30/02 705/14.16 |

(Continued)

FOREIGN PATENT DOCUMENTS

| | | | | |
|---|---|---|---|---|
| AU | 2012275227 B2 * | 10/2015 | | G06Q 30/02 |
| CN | 102622701 A | 8/2012 | | |

(Continued)

OTHER PUBLICATIONS

Leskovec et al., The Dynamics of Viral Marketing, ACM Transactions on the Web, 2007 (Year: 2007).*

(Continued)

*Primary Examiner* — Patricia H Munson
*Assistant Examiner* — Uche Byrd
(74) *Attorney, Agent, or Firm* — Morgan, Lewis & Bockius LLP

(57) ABSTRACT

A computer device includes a delivery management interface. The device receives a delivery operation on the delivery management interface. The device obtains target delivery information via an information management sub-module, The device obtains, according to the target delivery information, at least one piece of management sub-information corresponding to at least one management sub-module. The information management sub-module and the at least one management sub-module are distinct modules of a delivery management domain. The device processes the at least one piece of management sub-information using the at least one management sub-module. The device displays the target delivery information on the delivery management (Continued)

interface according to the processing result. The device also causes a display device to display the target delivery information according to separate modules corresponding to a delivery display domain.

14 Claims, 16 Drawing Sheets

(56) References Cited

U.S. PATENT DOCUMENTS

| | | | | |
|---|---|---|---|---|
| 2014/0244444 | A1* | 8/2014 | Zhang | G06Q 30/0635 705/26.81 |
| 2016/0212234 | A1 | 7/2016 | Qi et al. | |
| 2017/0213072 | A1* | 7/2017 | Li | G06T 11/00 |
| 2018/0084306 | A1* | 3/2018 | Hunter | H04H 60/66 |

FOREIGN PATENT DOCUMENTS

| | | |
|---|---|---|
| CN | 103729778 A | 4/2014 |
| CN | 105046527 A | 11/2015 |
| CN | 105117187 A | 12/2015 |
| CN | 109118258 A | 1/2019 |
| CN | 110874763 A | 3/2020 |

OTHER PUBLICATIONS

Tencent Technology, ISR, PCT/CN2021/095669, Aug. 24, 2021, 2 pgs.

Tencent Technology, WO, PCT/CN2021/095669, Aug. 24, 2021, 4 pgs.

Tencent Technology, IPRP, PCT/CN2021/095669, Dec. 13, 2022, 5 pgs.

* cited by examiner

INFORMATION DELIVERY METHOD, APPARATUS, AND DEVICE, AND COMPUTER-READABLE STORAGE MEDIUM

CROSS-REFERENCE TO RELATED APPLICATIONS

This application is a continuation application of PCT Patent Application No. PCT/CN2021/095669, entitled "INFORMATION DELIVERY METHOD, APPARATUS AND DEVICE, AND COMPUTER-READABLE STORAGE MEDIUM" filed on May 25, 2021, which claims priority to Chinese Patent Application No. 202010553240.X, filed with the State Intellectual Property Office of the People's Republic of China on Jun. 17, 2020, and entitled "AN INFORMATION DELIVERY METHOD, DEVICE AND STORAGE MEDIUM", all of which are incorporated herein by reference in their entirety.

FIELD OF THE TECHNOLOGY

This application relates to information processing technologies in the field of the Internet, and in particular, to an information delivery method, apparatus, and device, and a computer-readable storage medium.

BACKGROUND OF THE DISCLOSURE

At present, there is an increasing demand for obtaining product revenue through delivered information (for example, multimedia information). Delivery of information is usually implemented through a delivery system or a delivery application. Therefore, the delivery system or the delivery application has a strong correlation with the delivery of information.

Generally, to implement information delivery, usually the delivery system delivers information on a delivery device and displays the information on a display device to implement the delivery of the information on the display device. However, the delivery system used in the information delivery process is usually implemented in an agile way. Because the agile way adopted is a human-centered, iterative, step-by-step development method, the coupling degree of functional modules in the delivery system is high, and code and framework need to be constantly reconstructed to meet the continuously changing service demand. Therefore, the complexity of the information delivery is relatively high.

SUMMARY

Embodiments of this application provide an information delivery method, apparatus, and device, and a computer-readable storage medium, which can simplify the process of information delivery and improve the efficiency of the information delivery.

The technical solutions in the embodiments of this application are implemented as follows.

An embodiment of this application provides an information delivery method, performed by a computer device (e.g., a delivery device), including:

receiving, on a delivery management interface, a delivery operation and obtaining target delivery information via an information management sub-module;

obtaining, according to the target delivery information, at least one piece of management sub-information corresponding to at least one management sub-module, wherein the information management sub-module and the at least one management sub-module are separate (e.g., distinct, independent) modules of a delivery management domain, and the delivery management domain is a first domain of a delivery domain and the delivery management domain is used for managing delivered information in a delivery domain;

processing the at least one piece of management sub-information using the at least one management sub-module; and displaying, on the delivery management interface, the target delivery information according to the processing, and causing a display device to display the target delivery information according to separate modules corresponding to a delivery display domain, wherein the delivery display domain is a second domain of the delivery domain and the delivery display domain is used for displaying the delivered information in the delivery domain.

An embodiment of this application further provides an information delivery method, performed by a display device, including:

responding, by an information display sub-module, to an information display request, to display an information display interface, and instructing a device information sub-module to obtain display device information;

obtaining, by an information query sub-module, target delivery information corresponding to the display device information, the target delivery information being information delivered by a delivery device according to separate modules corresponding to a delivery management domain, the delivery management domain being a domain for managing delivered information in a delivery domain; and displaying, by an information playing sub-module, the target delivery information on the information display interface, the information display sub-module, the device information sub-module, the information query sub-module, and the information playing sub-module being separate modules obtained based on a sub-domain division result of a delivery display domain, and the delivery display domain being a domain for displaying the delivered information in the delivery domain.

An embodiment of this application provides a delivery apparatus for information delivery, including:

an information management sub-module, configured to receive, on a delivery management interface, a delivery operation on a delivery control and respond to the delivery operation, to obtain target delivery information;

a sub-information obtaining module, configured to obtain, according to the target delivery information, at least one piece of management sub-information corresponding to at least one management sub-module, the information management sub-module and the at least one management sub-module being separate modules obtained based on a sub-domain division result of a delivery management domain, and the delivery management domain being a domain for managing delivered information and separated from a delivery domain based on a delivery process;

a processing module, configured to process, through the at least one management sub-module, the at least one piece of management sub-information; and an information display module, configured to display, on the delivery management interface, the target delivery information according to a processing result, and instruct, based on the displayed target delivery information, a display device to display the target delivery information according to the separate modules corresponding to a delivery display domain, the delivery display domain being a domain for displaying the delivered information in the delivery domain.

An embodiment of this application provides a display apparatus for information delivery, including:

an information display sub-module, configured to respond to an information display request, to display an information display interface, and instruct a device information sub-module to obtain display device information;

an information query sub-module, configured to obtain target delivery information corresponding to the display device information, the target delivery information being information delivered by a delivery device according to separate modules corresponding to a delivery management domain, the delivery management domain being a domain for managing delivered information in a delivery domain; and an information playing sub-module, configured to display the target delivery information on the information display interface, the information display sub-module, the device information sub-module, the information query sub-module, and the information playing sub-module being separate modules obtained based on a sub-domain division result of a delivery display domain, and the delivery display domain being a domain for displaying the delivered information in the delivery domain.

An embodiment of this application provides a delivery device for information delivery, including:

a first memory, configured to store executable instructions; and a first processor, configured to implement, when executing the executable instructions stored in the first memory, the information delivery method applied to the delivery device provided in the embodiments of this application.

An embodiment of this application provides a display device for information delivery, including:

a second memory, configured to store executable instructions; and a second processor, configured to implement, when executing the executable instructions stored in the second memory, the information delivery method applied to the display device provided in the embodiment of this application.

An embodiment of this application provides a non-transitory computer-readable storage medium, storing executable instructions, the instructions, when being executed by a first processor, causing the first processor to implement the information delivery method applied to a delivery device; or when being executed by a second processor, causing the second processor to implement the information delivery method applied to a display device.

The embodiments of this application have at least the following beneficial effects: during delivery of target delivery information, the delivery device processes the target delivery information according to separate modules of a delivery management domain, so as to complete the delivery of the target delivery information in the delivery device, and then the display device displays the target delivery information according to the separate modules corresponding to the delivery display domain. Moreover, because the separate modules of the delivery management domain are obtained based on a sub-domain division result of the delivery management domain and the separate modules corresponding to the delivery display domain are obtained based on the sub-domain division result of the delivery display domain, the coupling degree of functional modules configured to display the target delivery information is low, thereby simplifying the process of information delivery and improving the efficiency of the information delivery.

DESCRIPTION OF EMBODIMENTS

Figure 1:
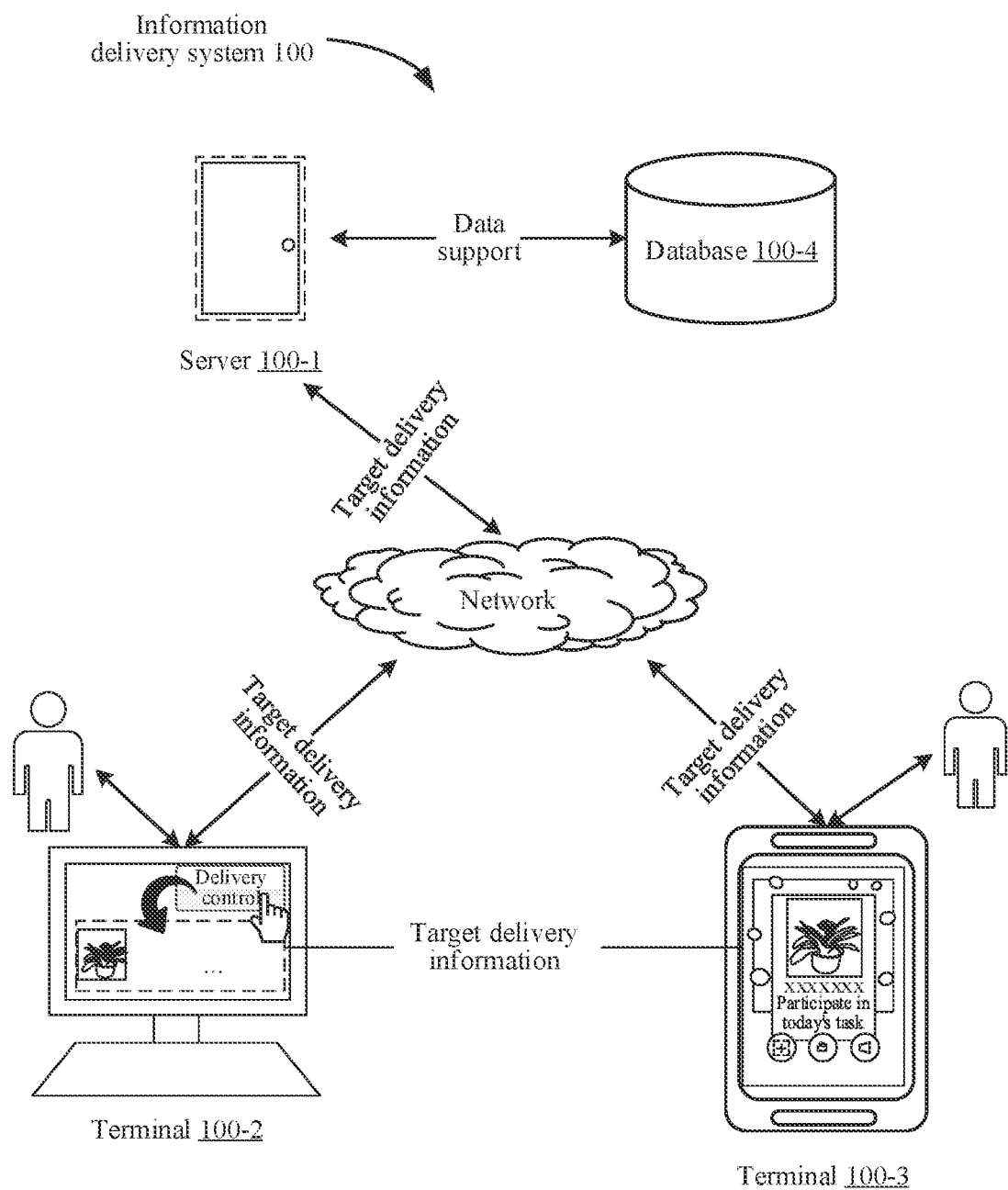
FIG. 1 is a schematic architecture diagram of an information delivery system according to an embodiment of this application.

To make the objectives, technical solutions, and advantages of this application clearer, the following describes this application in further detail with reference to the accompanying drawings. The described embodiments are not to be considered as a limitation to this application. All other embodiments obtained by a person of ordinary skill in the art without creative efforts shall fall within the protection scope of this application.

In the following description, the term "some embodiments" describes subsets of all possible embodiments, but it may be understood that "some embodiments" may be the same subset or different subsets of all the possible embodiments, and can be combined with each other without conflict.

In the following descriptions, the included term "first/second" is merely intended to distinguish similar objects but does not necessarily indicate a specific order of an object. It may be understood that "first/second" is interchangeable in terms of a specific order or sequence if permitted, so that the embodiments of this application described herein can be implemented in a sequence in addition to the sequence shown or described herein.

Unless otherwise defined, meanings of all technical and scientific terms used in the embodiments of this application are the same as those usually understood by a person skilled in the art to which this application belongs. Terms used in the embodiments of this application are merely intended to describe objectives of the embodiments of this application, but are not intended to limit this application.

Before the embodiments of this application are further described in detail, a description is made on terms in the embodiments of this application, and the terms in the embodiments of this application are applicable to the following explanations.

1) Domain driven design (DDD): The DDD is a method that establishes a domain model based on a domain in a business (e.g., a service), and designs and guides software development through the domain model. The domain model refers to a carrier that can accurately reflect a specific knowledge element in the domain of the service, and is a visual representation of a concept class in the domain or an object in the real world. By analyzing a problem domain (for example, a delivery domain), important service domain concepts are found and a relationship between the service domain concepts is established. In the embodiments of this application, the DDD may be used in the delivery domain to implement information delivery.

2) Bounded context (BC): The BC refers to separate applicability of a domain model. Through the bounded context, team members can clearly share consistent content and content that can be developed independently. Usually, the bounded context includes terms and application scenarios, and further includes nouns and verbs. The nouns may be used to name domain objects, such as products and orders, and correspond to entity objects. The verbs each represent an action or event, such as a product has been ordered and an order has been paid, and correspond to a domain event or a command. In addition, the bounded context is usually referred to as a context for short, and a management context and a display context involved in the embodiments of this application both are bounded contexts.

3) Entity: The entity refers to an object that is distinguished from other objects by its unique identity and is a basic element of the domain model, such as an order.

4) Value object: The value object refers to an object that is distinguished from other objects by its attributes, and for example, for a tile, the attributes used to distinguish the tile from the other objects are the size and the material. The value object can be shared in the domain model. In some embodiments, when the value object is needed in other places, a copy of the value object can be transferred as a parameter to implement sharing of the value object in the other places.

5) Aggregation root: The aggregation root is a special entity and is a data access window provided in a corresponding context to an external context. In other words, in the corresponding context, other contexts access all entities and value objects of the corresponding context through the aggregation root.

6) Internet of things (IoT) device: An IoT device refers to a hardware device that can access the Internet, for example, a shared power bank, a shared umbrella, a shared bicycle, a face recognition device, or the like. In the embodiments of this application, the display device may be an IoT device.

7) Information delivery: The information delivery refers to a process in which a delivery object delivers information to be delivered on an IoT device to obtain delivery revenue.

8) Design pattern: The design pattern is also known as a software design pattern and is a conclusion of code design experience that has been repeatedly used, known to most people, classified and catalogued. The design pattern is used to reuse code, make the code more easily understood by others, and ensure code reliability, and reusability of a program. The design pattern includes a variety of patterns, such as, a factory pattern, a waterfall pattern, an adapter pattern, and a prototype pattern.

9) Factory pattern: The factory pattern is also known as a creation pattern and is a way to create an object. Through the factory pattern, it is convenient to create a complex object for products having a same type of interface.

10) Waterfall pattern: The waterfall pattern (e.g., waterfall flow mode) is a project development framework. The development process is carried out in sequence by designing a series of stages. From the analysis of system requirements to the delivery and maintenance of a product, a loop feedback is generated at each stage. In the waterfall pattern, the development of software project is divided into development stages, demand analysis, element definition, basic design, detailed design, coding, monomer testing, combined testing, system testing, and the like, and a milestone method is used to strictly define inputs and outputs of the development stages. In some embodiments, when a required output is not met, the next stage of work will not be started.

11) Adapter pattern: The adapter pattern (e.g., adapter mode) is a process of adapting an interface of a functional module (for example, class) to a specified form. Through the adapter pattern, functional modules that cannot jointly implement a service function due to incompatibility of the interfaces are combined, to implement a specified function.

12) Prototype pattern: The prototype pattern is a creational design pattern, and by transferring a prototype object to an object that initiates creation, the object that initiates creation implements the creation by requesting the prototype object to copy the prototype object.

13) Sub-domains: The sub-domains refer to a division result corresponding to a service domain, and the sub-domains each correspond to a smaller problem domain. Generally, the sub-domains can be grouped, according to degrees of importance and functional attributes of the sub-domains, into three types of sub-domains, namely, a core domain, a general domain, and a support domain. The core domain is a sub-domain that determines a product and core competitiveness of a company, and is the main factor of service success and the core competitiveness of the company. The general domain is a general functional sub-domain that is used by the plurality of sub-domains without an excessively large quantity of personalized appeals. The support domain is a sub-domain that includes neither a function that determines a product and core competitiveness of a company, nor a general function.

14) Anticorruption layer: One context interacts with another context through some adaptations and transformations, known as an adaptation layer. In a context, sometimes an external context needs to be accessed, and the access to the external context is usually escaped through the anticorruption layer.

Generally speaking, to implement information delivery, the delivery of information on a delivery device (e.g., an electronic device, a computing device, a computer system, etc.) is usually achieved by delivering the information on the delivery device and displaying it on the display device through the delivery system. However, the delivery system used in the information delivery process is usually implemented in an agile manner. Because the agile method adopted is a human-centered, iterative, step-by-step development method, the coupling degree of functional modules in the delivery system is high, and code and framework need to be constantly reconstructed to meet the continuously changing service demand. Therefore, the complexity of the information delivery is high.

In addition, although the use of agile methods can ensure efficiency at an initial stage of obtaining of the delivery system, due to the lack of in-depth research and modeling in the delivery field, the code and framework need to be continuously reconstructed to meet the changing business and service needs. The overall system has high complexity and low maintainability. Furthermore, when using the delivery system to deliver information on display devices, multiple interactions between multiple functional modules with high coupling degree are required, resulting in high resource consumption.

Accordingly, there is a need for methods, systems, and devices that can deliver content to display devices more efficiently. In view of the above, the embodiments of this application provide an information delivery method, apparatus, and device, and a computer-readable storage medium, which can reduce the coupling degree of the functional modules in the delivery system, simplify the process of information delivery, improve the efficiency of information delivery, reduce the complexity of information delivery, and reduce the resource consumption. An exemplary application of a device for use in information delivery (including a delivery device and a display device) provided in the embodiments of this application is described below. The delivery device and the display device provided in the embodiments of this application both may be implemented as various types of user terminals such as a smart phone, a tablet, or a laptop, may also be implemented as a server, and may also be implemented as a terminal and a server. An exemplary application in which the delivery device is implemented as a terminal and a server and the display device is implemented as a terminal and a server is described below.

FIG. 1 is a schematic architecture diagram of an information delivery system 100 according to an embodiment of this application. As shown in FIG. 1, in order to support an information delivery application, in the information delivery system 100, a server 100-1 is connected to a terminal 100-2 (the server 100-1 and the terminal 100-2 jointly construct a delivery device of this embodiment of this application) and a terminal 100-3 (the server 100-1 and the terminal 100-3 jointly construct a display device of this embodiment of this application) via a network. The network may be a wide area network or a local area network, or a combination of a wide area network and a local area network. In addition, the information delivery system 100 further includes a database 100-4, configured to provide data support to the server 100-1 when the server 100-1 executes an information delivery method provided in the embodiments of this application.

In some embodiments, the terminal 100-2 is configured to: receive, on a delivery management interface (e.g., a content management interface), a delivery operation on a delivery control on the delivery management interface. The information management sub-module responds to the delivery operation to obtain target delivery information. The information management sub-module transmits the target delivery information to the server 100-1 via the network. The terminal 100-2 is further configured to: receive via the network a processing result transmitted by the server 100-1 and display, on the delivery management interface, the delivered target delivery information according to the processing result. The terminal 100-2 also transmits, via the network to the server 100-1 and based on the displayed target delivery information, a request for setting delivery status of the target delivery information to delivering.

The server 100-1 is configured to: receive via the network the target delivery information transmitted by terminal 100-2. The server 100-1 obtains, according to the target delivery information, at least one piece of management sub-information corresponding to at least one management sub-module. The information management sub-module and the at least one management sub-module being separate modules (e.g., independent modules, distinct modules, etc.) obtained based on a sub-domain division result of a delivery management domain, and the delivery management domain is a domain (e.g., field) for managing delivered information and separated from a delivery domain based on a delivery process; the at least one management sub-module processing the at least one piece of management sub-information, in which case the database 100-4 stores associated information of the target delivery information and the display device, so that the processing result is transmitted to the terminal 100-2 via the network. The server 100-1 is further configured to: receive via the network the request for setting the delivery status of the target delivery information to delivering transmitted by the terminal 100-2, and set the delivery status of the target delivery information in the database 100-4 to delivering. The server 100-1 is further configured to: obtain via the network an information display request transmitted by the terminal 100-3, respond to the information display request through an information display sub-module, and instruct a device information sub-module to obtain display device information; obtain, through an information query sub-module, target delivery information corresponding to the display device information from the database 100-4, the target delivery information being information delivered by the delivery device according to separate modules corresponding to a delivery management domain; and transmit via the network and through an information playing sub-module, the target delivery information to the terminal 100-3, to complete delivery of the target delivery information on the display device delivery; the information display sub-module, the device information sub-module, the information query sub-module, and the information playing sub-module being separate modules obtained based on a sub-domain division result of a delivery display domain.

The terminal 100-3 is configured to transmit an information display request to the server via the network. The terminal 100-3 is also configured to: receive via the network the target delivery information transmitted by the server 100-1 for the information display request and display the target delivery information on an information display interface.

Figure 2:
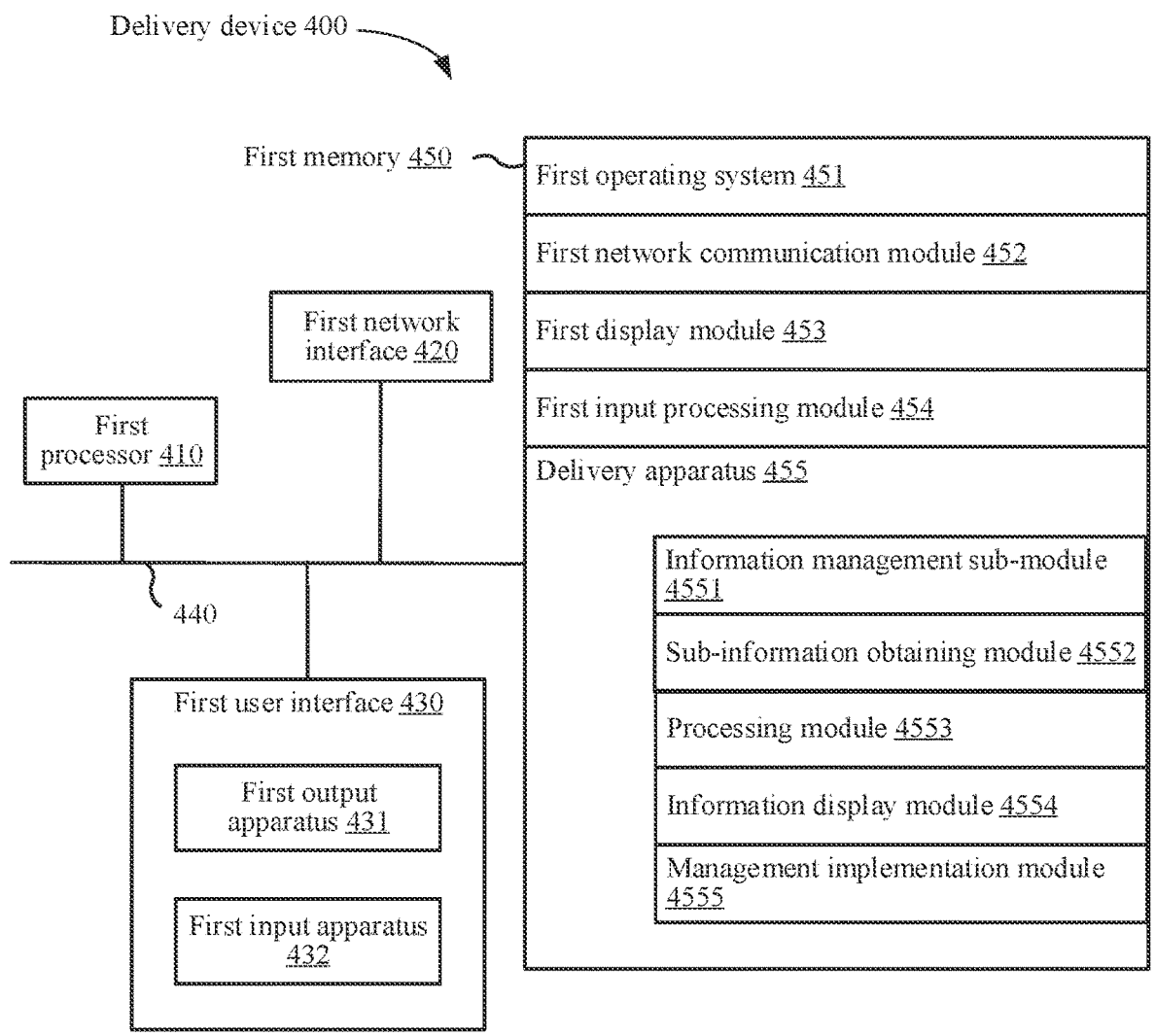
FIG. 2 is a schematic diagram of a composition structure of a delivery device according to an embodiment of this application.

FIG. 2 is a schematic diagram of a composition structure of a delivery device (e.g., an electronic device, a computing device, a computer system, etc.) according to an embodiment of this application. As shown in FIG. 2, a delivery device 400 includes: at least one first processor 410, a first memory 450, at least one first network interface 420, and a first user interface 430. Components in the delivery device 400 are coupled together through a first bus system 440. It may be understood that the first bus system 440 is configured to implement connection and communication between the components. In addition to a data bus, the first bus system 440 further includes a power bus, a control bus, and a status signal bus. However, for ease of clear description, all types of buses are marked as the first bus system 440 in FIG. 2.

The first processor 410 may be an integrated circuit chip having a signal processing capability, for example, a general purpose processor, a digital signal processor (DSP), or another programmable logic device (PLD), discrete gate, transistor logical device, or discrete hardware component. The general purpose processor may be a microprocessor, any conventional processor, or the like.

The first user interface 430 includes one or more first output apparatuses 431 that can present media content, including one or more speakers and/or one or more visual display screens. The first user interface 430 also includes one or more first input apparatuses 432, including user interface components that facilitate user input, such as a keyboard, a mouse, a microphone, a touch screen display, a camera, other input buttons, and controls.

The first memory 450 may be a volatile memory or a non-volatile memory, or may include a volatile memory and a non-volatile memory. The non-volatile memory may be a read only memory (ROM), or may be a random access memory (RAM). The first memory 450 described in this embodiment of this application is to include any other suitable type of memories. In some embodiments, the first memory 450 includes one or more storage devices that are physically located away from the first processor 410.

In some embodiments, the first memory 450 can store data to support various operations, examples of which include programs, modules, and data structures, or subsets or supersets thereof, as illustrated below.

A first operating system 451 includes a system program configured to process various basic system services and perform a hardware-related task, for example, a framework layer, a core library layer, and a driver layer, and is configured to implement various basic services and process a hardware-related task.

A first network communication module 452 is configured to reach another computing device through one or more (wired or wireless) first network interfaces 420. Exemplary first network interfaces 420 include: Bluetooth, wireless compatible authentication (WiFi), a universal serial bus (USB), and the like.

A first display module 453 is configured to display information by using a first output apparatus 431 (for example, a display screen or a speaker) associated with one or more first user interfaces 430 (for example, a user interface configured to operate a peripheral device and display content and information).

A first input processing module 454 is configured to detect one or more user inputs or interactions from one of the one or more first input apparatuses 432 and translate the detected input or interaction.

In some embodiments, the delivery apparatus for information delivery provided in this embodiment of this application (hereinafter referred to as the delivery apparatus) may be implemented by software. FIG. 2 shows a delivery apparatus 455 stored in the first memory 450, which may be software in the form of programs and plug-ins, including the following software modules: an information management sub-module 4551, a sub-information obtaining module 4552, a processing module 4553, an information display module 4554, and a management implementation module 4555. The functions of the modules are described below.

Figure 3:
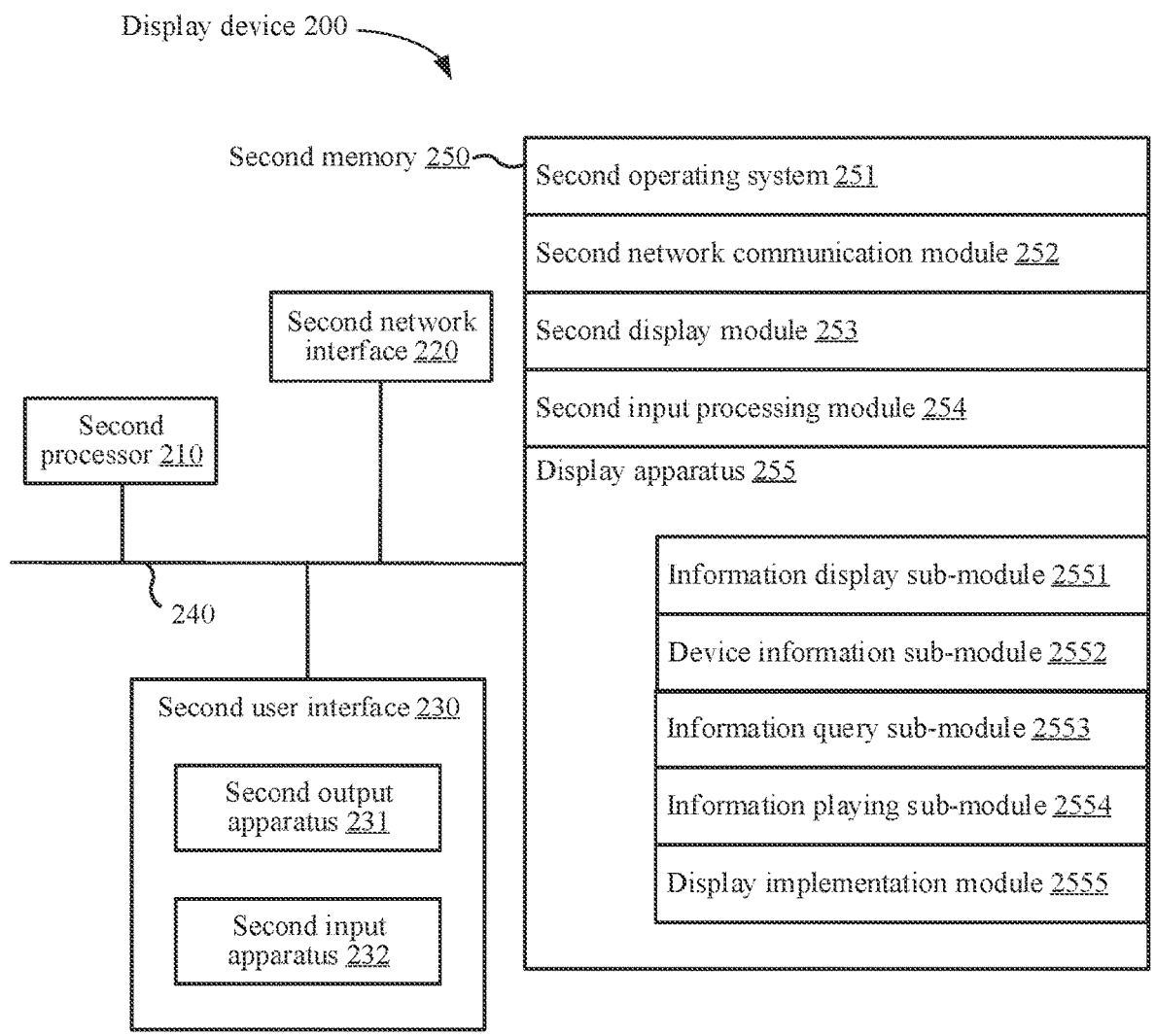
FIG. 3 is a schematic diagram of a composition structure of a display device according to an embodiment of this application.

FIG. 3 is a schematic diagram of a composition structure of a display device 200 according to an embodiment of this application. As shown in FIG. 3, the display device 200 includes: at least one second processor 210, a second memory 250, at least one second network interface 220, and a second user interface 230. Components of the display device 200 are coupled together through a second bus system 240. It may be understood that the second bus system 240 is configured to implement connection and communication between the components. In addition to a data bus, the second bus system 240 further includes a power bus, a control bus, and a status signal bus. However, for ease of clear description, all types of buses are marked as the second bus system 240 in FIG. 3.

The second processor 210 may be an integrated circuit chip having a signal processing capability, for example, a general-purpose processor, a digital signal processor, or another programmable logic device, a discrete or transistor logic device, or a discrete hardware component, where the general-purpose processor may be a microprocessor, any conventional processor, or the like.

The second user interface 230 includes one or more second output apparatuses 231 that can present media content, including one or more speakers and/or one or more visual display screens. The second user interface 230 also includes one or more second input apparatuses 232, including user interface components that facilitate user input, such as a keyboard, a mouse, a microphone, a touch screen display, a camera, other input buttons, and controls.

The second memory 250 may be a volatile memory or a non-volatile memory, or may include a volatile memory and a non-volatile memory. The non-volatile memory may be a read only memory, or may be a random access memory. The second memory 250 described in this embodiment of this application is to include any other suitable type of memories. In some embodiments, the second memory 250 includes one or more storage devices that are physically located away from the second processor 210.

In some embodiments, the second memory 250 can store data to support various operations, examples of which include programs, modules, and data structures, or subsets or supersets thereof, as illustrated below.

A second operating system 251 includes a system program configured to process various basic system services and perform a hardware-related task, for example, a framework layer, a core library layer, and a driver layer, and is configured to implement various basic services and process a hardware-related task.

A second network communication module 252 is configured to reach another computing device through one or more (wired or wireless) second network interfaces 220. Exemplary second network interfaces 220 include: Bluetooth, wireless compatible authentication, a universal serial bus (USB), and the like.

A second display module 253 is configured to display information by using a second output apparatus 231 (for example, a display screen or a speaker) associated with one or more second user interfaces 230 (for example, a user interface configured to operate a peripheral device and display content and information).

A second input processing module 254 is configured to detect one or more user inputs or interactions from one of the one or more second input apparatuses 232 and translate the detected input or interaction.

In some embodiments, the display apparatus for information delivery provided in the embodiments of this application (hereinafter referred to as a display apparatus) may be implemented by software. FIG. 3 shows a display apparatus 255 stored in the second memory 250, which may be software in the form of programs and plug-ins, including the following software modules: an information display sub-module 2551, a device information sub-module 2552, an information query sub-module 2553, an information playing sub-module 2554, and a display implementation module 2555. The functions of the modules are described below.

In some other embodiments, the apparatus provided in this embodiment of the application may be implemented by using hardware. For example, the delivery apparatus and the display apparatus provided in this embodiment of the application may be a processor in a form of a hardware decoding processor, programmed to perform the information delivery method provided in the embodiments of the application. For example, the processor in the form of a hardware decoding processor may use one or more application-specific integrated circuits (ASIC), a DSP, a programmable logic device (PLD), a complex programmable logic device (CPLD), a field-programmable gate array (FPGA), or other electronic components.

The following describes the information delivery method provided in this embodiment of this application.

Figure 4:
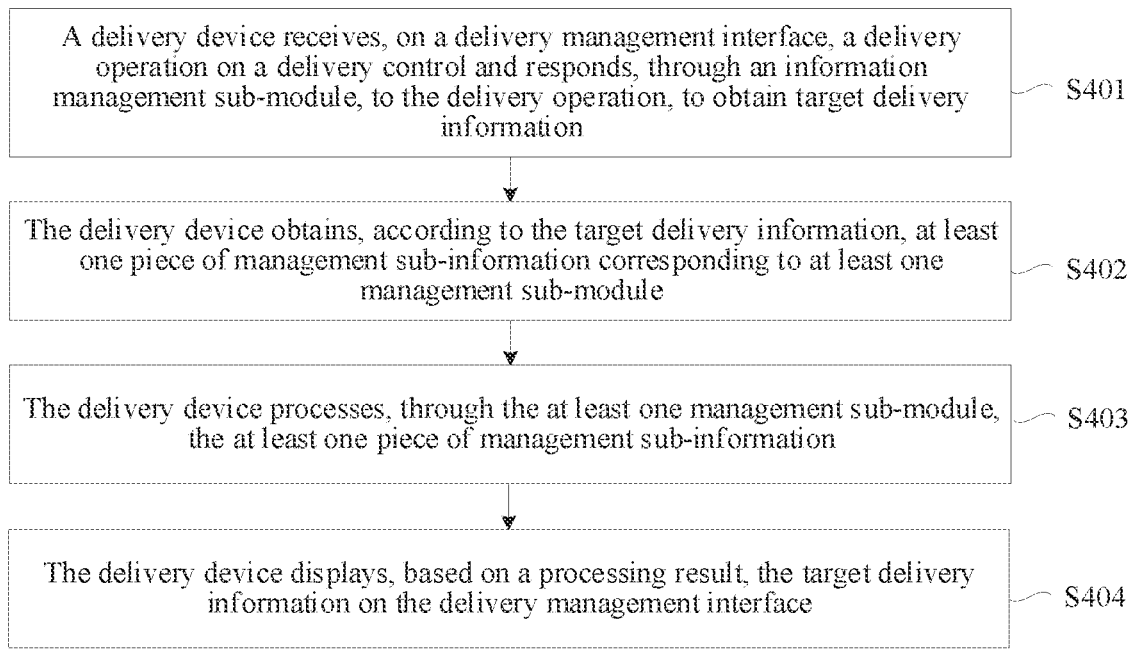
FIG. 4 is a schematic flowchart of an information delivery method according to an embodiment of this application.

FIG. 4 is a schematic flowchart of an information delivery method according to an embodiment of this application. The following describes the steps shown in FIG. 4.

S401: A delivery device receives, on a delivery management interface, a delivery operation on a delivery control. The delivery device responds to the delivery operation through an information management sub-module, to obtain target delivery information.

In this embodiment of this application, during information delivery (e.g., delivering of content) by a delivery object, an application for delivering information is run on the delivery device, that is, a delivery management interface (e.g., a content management interface) is displayed. In this case, because the delivery management interface is provided with the delivery control and the delivery control is used to receive the corresponding operation to trigger delivery of information, therefore, when the delivery object operates on the delivery control on the delivery management interface, the delivery device receives the delivery operation on the delivery control. In addition, because the delivery device includes a functional module for delivering information, that is, the information management sub-module, information to be delivered can be obtained by responding, by the delivery device, to the received delivery operation by using the information management sub-module. The information to be delivered is the target delivery information.

The delivery object is an object that delivers information on the display device through the delivery device, for example, a merchant, a delivery administrator, or the like. The delivery management interface refers to an interface for implementing information delivery management. The information delivery management herein includes processing such as adding, deleting, checking, and modifying of information. The adding of information is used as an example to describe the processing of information delivery management. The delivery control is at least one touchable control. For example, when the delivery object performs information delivery, after information about a delivery copy, a delivery merchant, a delivery device, delivery duration, and the like is inputted and a confirmation button is clicked, a control for inputting the information about the delivery copy, the delivery merchant, the delivery device, the delivery duration and the like and the confirmation button form the delivery control. The corresponding delivery operation refers to an operation for triggering the delivery control, for example, an operation such as an input operation, a click operation, a selection operation, or a gesture operation, or a combination of a plurality of operations. The delivery management interface is supported by the information management sub-module to implement information delivery management. The target delivery information is the delivered information, for example, an electronic poster, an interactive poster (a poster that can interact with a user), an applet, or the like. The target delivery information may include at least one piece of information such as information content, delivery type, delivery batch number, delivery time, delivery merchant number, and delivery status.

Figure 5:
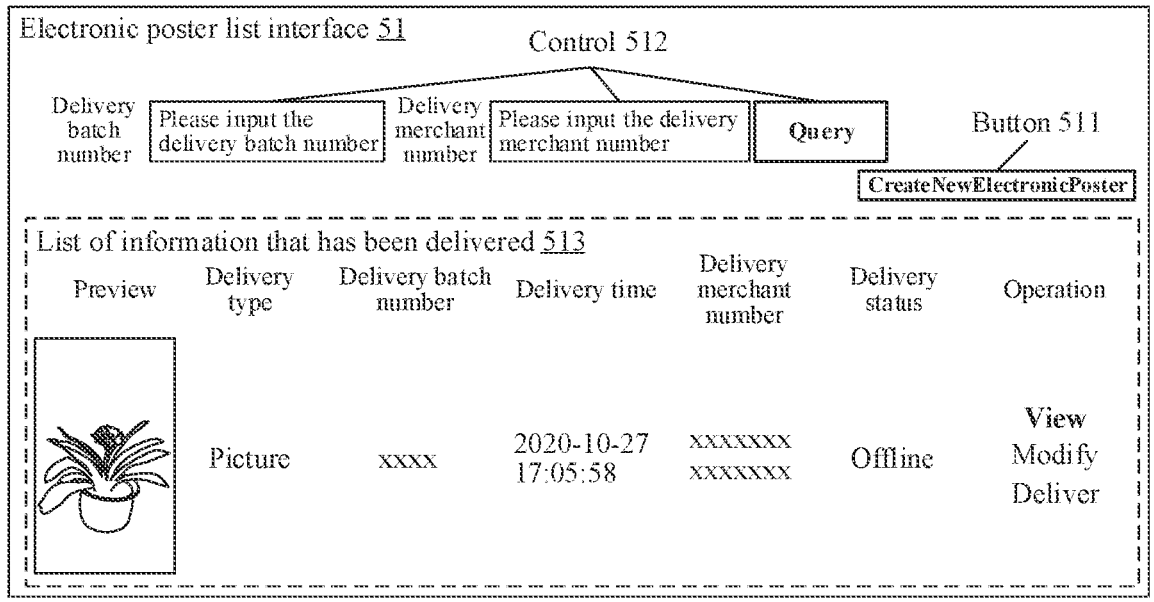
FIG. 5 is a schematic exemplary diagram of a delivery management interface according to an embodiment of this application.

For example, FIG. 5 is a schematic exemplary diagram of a delivery management interface according to an embodiment of this application. FIG. 5 illustrates an electronic poster list interface 51 (the delivery management interface) corresponding to delivery information of an electronic poster type. The electronic poster list interface 51 displays a "Create New Electronic Poster" button 511 (e.g., the delivery control for delivering information/content, a posting control to post information/content, etc.). In some embodiments, when the "Create New Electronic Poster" button 511 is selected (e.g., a delivery operation) to add a new electronic poster (e.g., target delivery/content information, target posting information), delivery of the new electronic poster on the display device can be implemented (e.g., new electronic posters, or new content, can be displayed on a display device). In addition, the electronic poster list interface 51 also displays a control 512 for querying a delivery batch number and a delivery merchant number (in addition, prompt information of "Delivery batch number" and "Delivery merchant number" is correspondingly displayed besides two input boxes in the control 512, and prompt information of "Please input the delivery batch number" and "Please input the delivery merchant number" is respectively displayed in the two input boxes in the control 512) and a list of information that has been delivered 513. For each piece of information in the list of information that has been delivered 513, corresponding preview (picture displayed), delivery type (picture or the like), delivery batch number ("xxxx"), delivery time (2020-10-27 17:05:58), delivery merchant number ("xxxxxxxxxxxxxx"), delivery status ("offline"), and operations that can be performed (view, modify, and deliver (when the delivery status is "offline", the operation is "deliver"; and when the delivery status is "delivering", the operation is "offline")) are further displayed.

Figure 6:
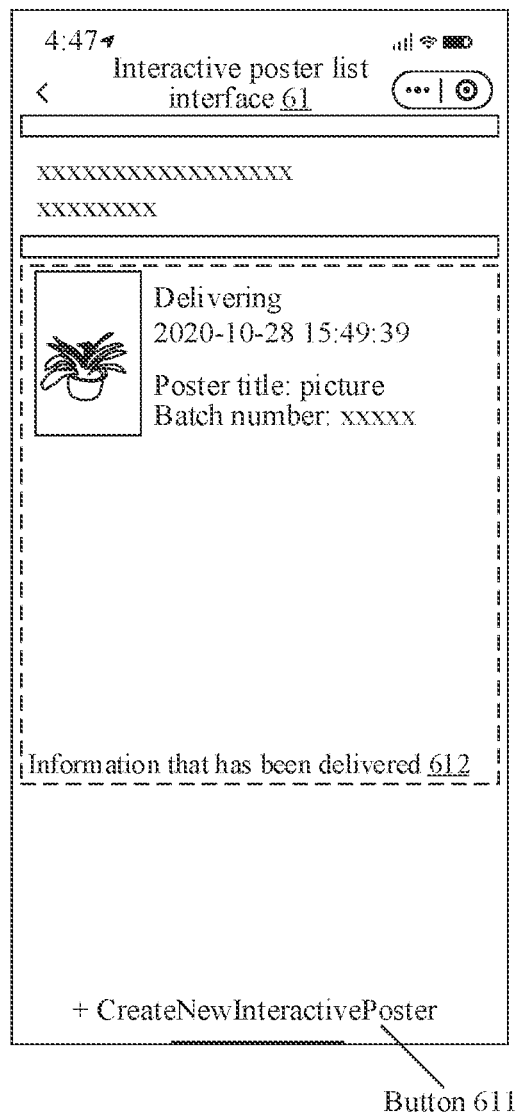
FIG. 6 is a schematic diagram of another exemplary delivery management interface according to an embodiment of this application.

FIG. 6 is a schematic diagram of another exemplary delivery management interface according to an embodiment of this application. FIG. 6 illustrates an interactive poster list interface 61 (the delivery management interface) corresponding to delivery information of an interactive poster type. The interactive poster list interface 61 displays a "+CreateNewInteractivePoster" button 611 (the delivery control). When the "+CreateNewinteractivePoster" button 611 is clicked (the delivery operation) to add a new interactive poster (the target delivery information), delivery of the new interactive poster on the display device can be implemented. In addition, the interactive poster list interface 61 also displays information that has been delivered 612. For each piece of information in the information that has been delivered 612, corresponding preview (for example, a picture), delivery status (delivering), delivery time (2020-10-28 15:49:39), an attribute of the interactive poster (poster title: picture), and delivery batch number ("xxxxx") are displayed.

S402: The delivery device obtains (e.g., acquires), according to the target delivery information, at least one piece of management sub-information corresponding to at least one management sub-module.

In an embodiment of the present application, the delivery device further includes at least one management sub-module. The at least one management sub-module is configured to process information to be delivered, to realize the delivery of the delivered information on the delivery device. Therefore, after the delivery device obtains the target delivery information, the target delivery information is processed by using the at least one management sub-module, to complete the delivery of the target delivery information on the delivery device. Here, the at least one management sub-module processes the target delivery information, so that information to be processed by each of the at least one management sub-module is first obtained for the target delivery information during the delivery on the delivery device. After the corresponding information to be processed is obtained for each management sub-module, at least one piece of information to be processed corresponding to the at least one management sub-module is obtained, the at least one piece of information to be processed being the at least one piece of management sub-information. The at least one management sub-module is in one-to-one correspondence to the at least one piece of management sub-information.

The information management sub-module and the at least one management sub-module are separate (e.g., distinct, independent, etc.) modules obtained based on a sub-domain division result of a delivery management domain and the delivery management domain being a domain for managing delivered information and separated from a delivery domain based on a delivery process.

The at least one management sub-module includes at least one of an information attribute sub-module, a delivery relationship sub-module, an information risk sub-module, an information counting sub-module, and an information storage sub-module. Correspondingly, the at least one piece of management sub-information includes at least one of a target information attribute, a target delivery relationship, target risk information, target counting limit information, and target storage information.

The information attribute sub-module refers to a functional module configured to manage an attribute of the target delivery information. In the at least one piece of management sub-information, the corresponding management sub-information is a target information attribute. The target information attribute refers to an attribute such as an information identification, delivery status, a network address, and delivery time of the target delivery information.

The delivery relationship sub-module refers to a functional module configured to manage a delivery relationship of the target delivery information. In the at least one piece of management sub-information, the corresponding management sub-information is a target delivery relationship. The target delivery relationship refers to a delivery object and a display device that are associated with the target delivery information, that is, information about the target delivery information is delivered by which merchant to which display device.

The information risk sub-module refers to a functional module configured to assess whether the target delivery information satisfies a preset specific condition. In the at least one piece of management sub-information, the corresponding management sub-information is target risk information. The target risk information refers to risk information of the target delivery information, such as satisfying the preset specific condition or not satisfying the preset specific condition. The preset specific condition may be a determining condition for whether the target delivery information is content that is allowed to be delivered, such as the promotion of functional applications, activities, etc.

The information counting sub-module refers to a functional module configured to determine a delivery permission based on a quantity of pieces of the target delivery information corresponding to the delivery object. The delivery permission may include allowing the delivery and prohibiting the delivery. In the at least one piece of management sub-information, the corresponding management sub-information is target counting limit information. The target counting limit information refers to a maximum quantity of delivered items permitted and a quantity of items that have been delivered currently.

The information storage sub-module refers to a functional module configured to store information to be stored corresponding to the target delivery information. In the at least one piece of management sub-information, the corresponding management sub-information is target storage information. The target storage information refers to the information to be stored corresponding to the target delivery information, such as a video or a picture to be delivered.

S403: The delivery device processes, through the at least one management sub-module, the at least one piece of management sub-information.

In this embodiment of this application, after the at least one management sub-module in the delivery device obtains the at least one piece of management sub-information in one-to-one correspondence thereto, the management sub-module processes the corresponding management sub-information, so that the delivery of the target delivery information on the delivery device is completed. Therefore, the delivery device can obtain a successful delivery processing result including the target delivery information. In this case, subsequent S404 is performed. Certainly, the processing result obtained by the delivery device may also be delivery failure of the target delivery information. In this case, the delivery process is ended.

For example, the information risk sub-module obtains the target risk information corresponding to the target delivery information, and ends the delivery process upon determining that the target delivery information does not meet the preset specific condition according to the target risk information.

Upon determining that the target delivery information meets the preset specific condition according to the target risk information, the information counting sub-module obtains target counting limit information corresponding to the target delivery information, and ends the delivery process upon determining that the target delivery information is restricted by the quantity limit according to the target counting limit information. Upon determining that the target delivery information is not restricted by the quantity limit according to the target counting limit information, the information counting sub-module updates the quantity of items that have been delivered, the information attribute sub-module obtains a target information attribute of the target delivery information and stores the target information attribute, the delivery relationship sub-module obtains a target delivery relationship corresponding to the target delivery information and stores the target delivery relationship, and the information storage sub-module obtains target storage information corresponding to the target delivery information and stores the target storage information. In this way, the delivery of the target delivery information on the delivery device is completed.

Here, after the target delivery information is delivered on the delivery device, the display device can call the target delivery information according to the separate modules corresponding to the delivery display domain, to implement the delivery of the target delivery information on the display device.

Figure 7:
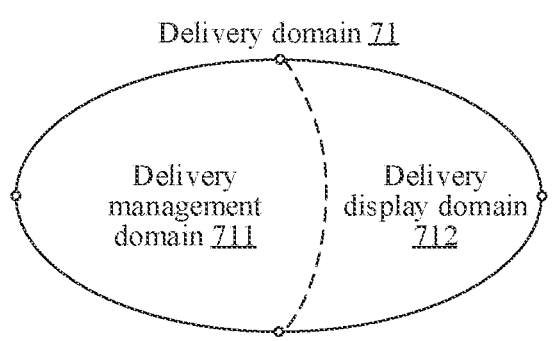
FIG. 7 is a schematic exemplary diagram of a division result of a delivery domain according to an embodiment of this application.

The delivery display domain is also a delivery domain. In other words, the delivery domain includes two separate parts: the delivery management domain and the delivery display domain. As shown in FIG. 7, a delivery domain 71 (e.g., delivery field) includes a delivery management domain 711 (e.g., a content management domain, a content management field) and a delivery display domain 712 (e.g., content display domain, content display field). The delivery management domain 711 refers to a service domain corresponding to a delivery object end and is used for managing delivered information, including viewing, creating, deleting, modifying, and the like. The delivery display domain 712 refers to a service domain corresponding to a display device end and is used for displaying target delivery information delivered on an IoT device by the delivery object through the delivery device.

S404: The delivery device displays, based on a processing result, the target delivery information on the delivery management interface.

In other words, when the processing result is that the target delivery information is successfully delivered, that is, after the delivery device completes the delivery of the target delivery information, the delivery management interface displays the delivered target delivery information, to manage the delivered information according to the displayed target delivery information (for example, delivering, viewing, offline, modifying, deleting, and the like). For the displayed target delivery information, for example, the information displayed in the list of information that has been delivered 513 in FIG. 5 and the information displayed in the information that has been delivered 612 in FIG. 6.

During delivery processing performed by the delivery device based on the displayed target delivery information, for example, when the delivery status of the target delivery information is updated to "delivering" by clicking a delivery button for the target delivery information, the display device is triggered (e.g., instructed, caused to) to perform displaying of the target delivery information, that is, the display device displays the target delivery information according to the separate modules corresponding to the delivery display domain, to complete the delivery of the target delivery information on the display device. The delivery display domain is a domain for displaying the delivered information in the delivery domain.

Figure 8A:
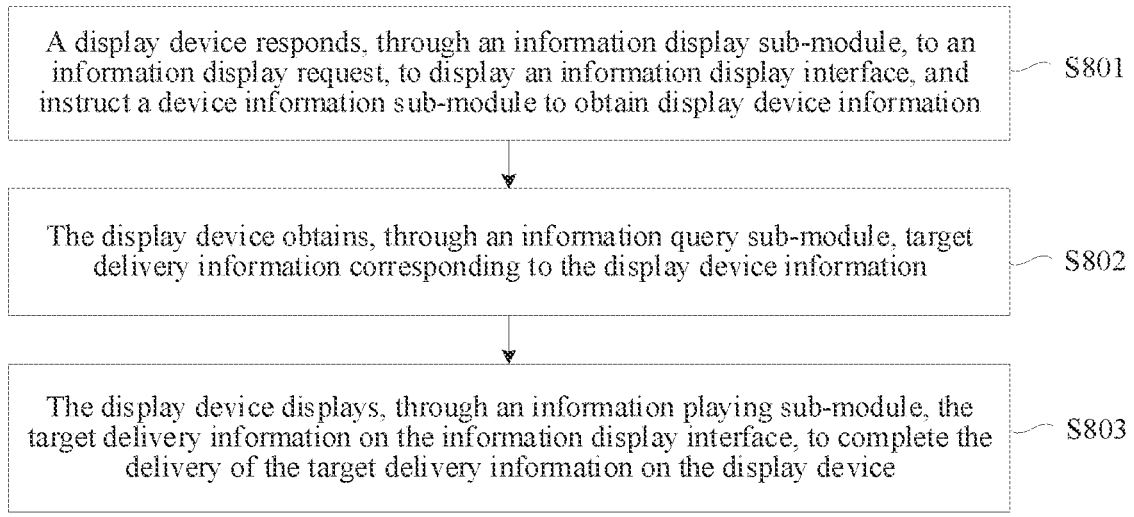
FIG. 8A is another schematic flowchart of an information delivery method according to an embodiment of this application.

FIG. 8A is another schematic flowchart of an information delivery method according to an embodiment of this application. Referring to FIG. 8A, the information delivery method includes the following steps:

S801: A display device responds to an information display request through an information display sub-module to display an information display interface, and instructs a device information sub-module to obtain display device information.

In this embodiment of this application, after a delivery object completes the creation of a target delivery object in the delivery device and updates delivery status to "delivering", when an application for displaying delivered information is run on the display device, the display device has received the information display request. Because the display device includes a functional module for triggering displaying of the delivered information, that is, the information display sub-module, the display device can respond to the information display request by using the information display sub-module, display the information display interface for displaying the delivered information, and instruct the device information sub-module to obtain the device information of the display device. Here, the obtained device information of the display device is the display device information, for example, device identifications such as a device number and a device model of the display device.

The information display sub-module is configured to display the delivered information in combination with other functional modules in the display device (for example, the device information sub-module, an information query sub-module, and an information playing sub-module). The device information sub-module is configured to obtain the identification information of the display device.

S802: The display device obtains, through an information query sub-module, target delivery information corresponding to the display device information.

In this embodiment of this application, after a device information obtaining sub-module obtains the display device information, the information display sub-module instructs the information query sub-module to obtain the delivered information associated with the display device information. Since the delivery object completes the delivery of the target delivery information on the delivery device side, the delivered information associated with the display device information includes the target delivery information. Therefore, the information query sub-module of the display device can obtain the target delivery information.

The information query sub-module is configured to query the delivered information corresponding to the display device. The target delivery information is information delivered by the delivery device according to separate modules corresponding to a delivery management domain. The delivery management domain is a domain for managing delivered information in a delivery domain.

S803: The display device displays, through an information playing sub-module, the target delivery information on the information display interface, to complete the delivery of the target delivery information on the display device.

Figure 8B:
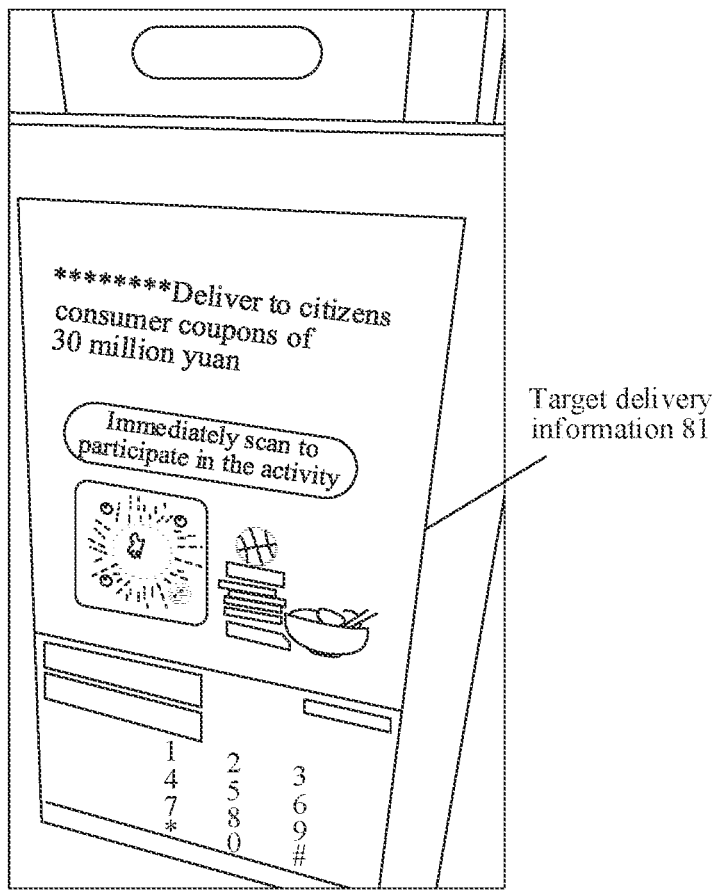
FIG. 8B is a schematic exemplary diagram of displaying of target delivery information according to an embodiment of this application.
Figure 8C:
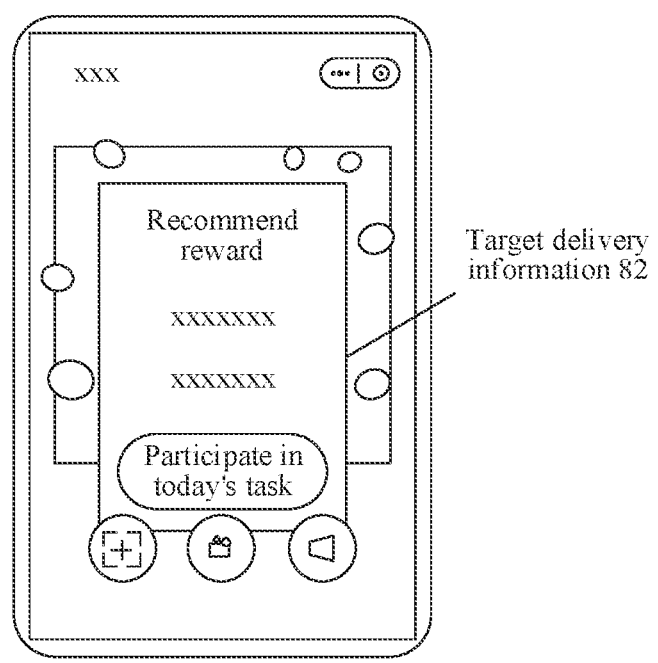
FIG. 8C is a schematic exemplary diagram of displaying of target delivery information according to an embodiment of this application.

In this embodiment of this application, after the information query sub-module obtains the target delivery information, the information display sub-module instructs the information playing sub-module to display the target delivery information on the information display interface. In this case, the delivery of the target delivery information on the display device is completed, for example, target delivery information 81 in FIG. 8B and target delivery information 82 in FIG. 8C.

The information playing sub-module is configured to play the delivered information. In addition, the information display sub-module, the device information sub-module, the information query sub-module, and the information playing sub-module are separate modules obtained based on a sub-domain division result of a delivery display domain, and the delivery display domain is a domain for displaying the delivered information and separated from a delivery domain based on a delivery process.

Figure 9:
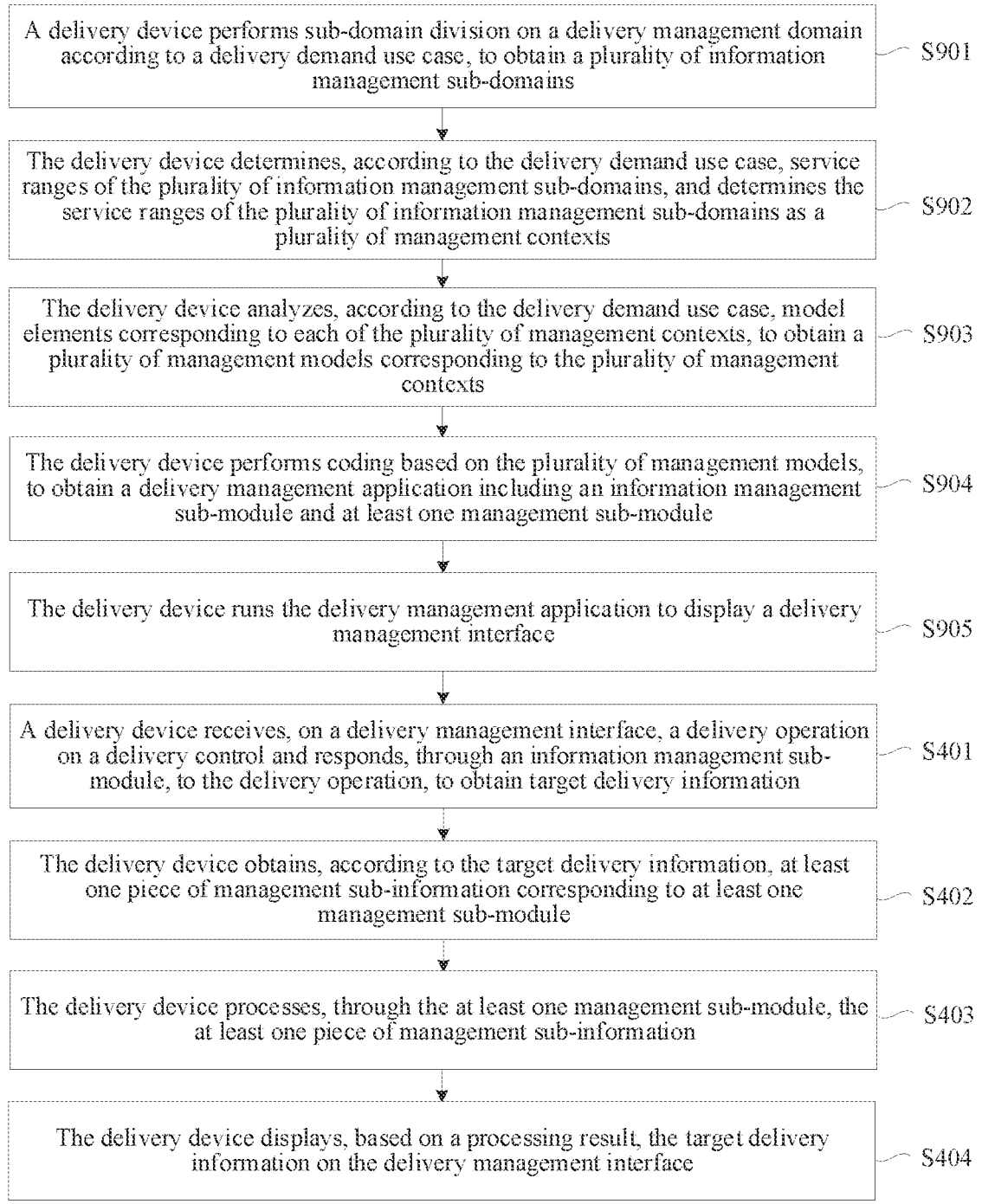
FIG. 9 is another schematic flowchart of an information delivery method according to an embodiment of this application.

FIG. 9 is another schematic flowchart of an information delivery method according to an embodiment of this application. Referring to FIG. 9, in this embodiment of this application, before S401, the method further includes S901-S905. In other words, before a delivery device receives a delivery operation on a delivery control on a delivery management interface, the information delivery method further includes S901-S905. The following describes the steps.

S901: A delivery device performs sub-domain division (e.g., divides the delivery management field or domain into sub-domains) on a delivery management domain according to a delivery demand use case, to obtain a plurality of information management sub-domains.

In this embodiment of this application, before the delivery device delivers target delivery information, the method further includes a process of obtaining, by the delivery device based on a domain-driven design method, an application for delivering information by using the delivery demand use case. First, because a delivery domain includes two separate service domains (e.g., two independent business fields): a delivery management domain and a delivery display domain. For the delivery management domain, the delivery device performs sub-domain division according to the delivery demand use case, and the sub-domains obtained after division are the plurality of information management sub-domains. Here, the delivery demand use case refers to service knowledge of the delivery domain.

The plurality of information management sub-domains include at least one of an information storage sub-domain, an information counting sub-domain, an information attribute sub-domain, an information risk sub-domain, and a delivery relationship sub-domain, and a delivery management sub-domain. The delivery management sub-domain refers to a core domain for managing the delivered information. The information storage sub-domain refers to a support domain for storing the delivered information. The information counting sub-domain refers to a support domain for counting a quantity of pieces of the delivered information. The information attribute sub-domain refers to a support domain corresponding to an attribute of the delivered information. The information risk sub-domain refers to a support domain for determining whether the delivered information satisfies a preset specific condition. The delivery relationship sub-domain refers to a support domain corresponding to a delivery object and the display device associated with the delivered information.

Figure 10:
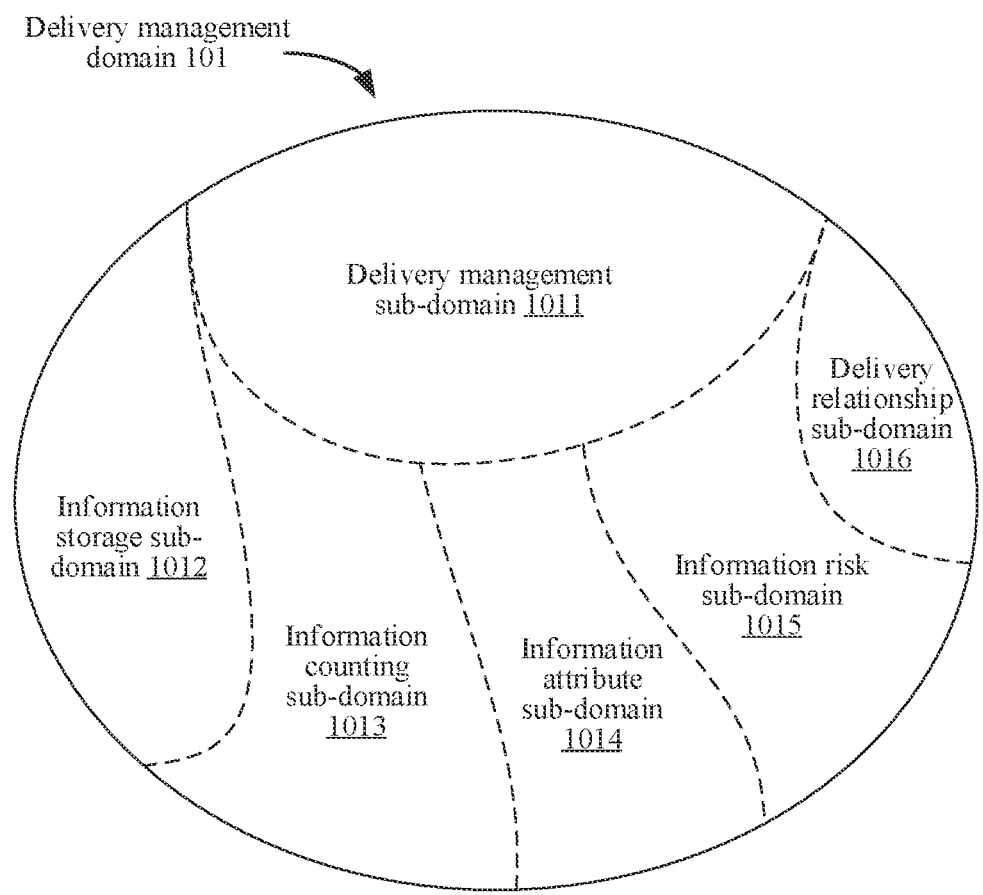
FIG. 10 is a schematic exemplary diagram of a sub-domain division result of a delivery management domain according to an embodiment of this application.

FIG. 10 is a schematic exemplary diagram of a sub-domain division result of a delivery management domain according to an embodiment of this application. As shown in FIG. 10, a delivery management domain 101 includes six information management sub-domains: a delivery management sub-domain 1011, an information storage sub-domain 1012, an information counting sub-domain 1013, an information attribute sub-domain 1014, an information risk sub-domain 1015, and a delivery relationship sub-domain 1016. In addition, the delivery management sub-domain 1011 is a core domain, and the information storage sub-domain 1012, the information counting sub-domain 1013, the information attribute sub-domain 1014, the information risk sub-domain 1015, and the delivery relationship sub-domain 1016 are all support domains for the delivery management sub-domain 1011.

S902: The delivery device determines, according to the delivery demand use case, service ranges (e.g., service scope, business scope) of the plurality of information management sub-domains, and determines the service ranges of the plurality of information management sub-domains as a plurality of management contexts.

In this embodiment of this application, after the delivery device obtains the plurality of information management sub-domains, a service range corresponding to each information management sub-domain in the plurality of information management sub-domains is determined according to the delivery demand use case, and a bounded context corresponding to each information management sub-domain is obtained, which is referred to as the management context herein. Therefore, the plurality of management contexts corresponding to the plurality of information management sub-domains are obtained.

The plurality of management contexts include at least one of an information storage context, an information counting context, an information attribute context, an information risk context, and a delivery relationship context, and an information management context. Moreover, the plurality of management contexts are in one-to-one correspondence with the plurality of information management sub-domains, that is, the information management context is the bounded context of the delivery management sub-domain, the information storage context is the bounded context of the information storage sub-domain, the information counting context is the bounded context of the information counting sub-domain, the information attribute context is the bounded context of the information attribute sub-domain, the information risk context is the bounded context of the information risk sub-domain, and the delivery relationship context is the bounded context of the delivery relationship sub-domain. Here, because the delivery management sub-domain is the core domain and the information storage sub-domain, the information counting sub-domain, the information attribute sub-domain, the information risk sub-domain, and the delivery relationship sub-domain are all support domains, the information management context, the information storage context, the information counting context, the information attribute context, the information risk context, and the delivery relationship context respectively corresponding to the information storage sub-domain, the information counting sub-domain, the information attribute sub-domain, the information risk sub-domain, and the delivery relationship sub-domain each have a dependency relationship with the information management context of the delivery management sub-domain.

Figure 11:
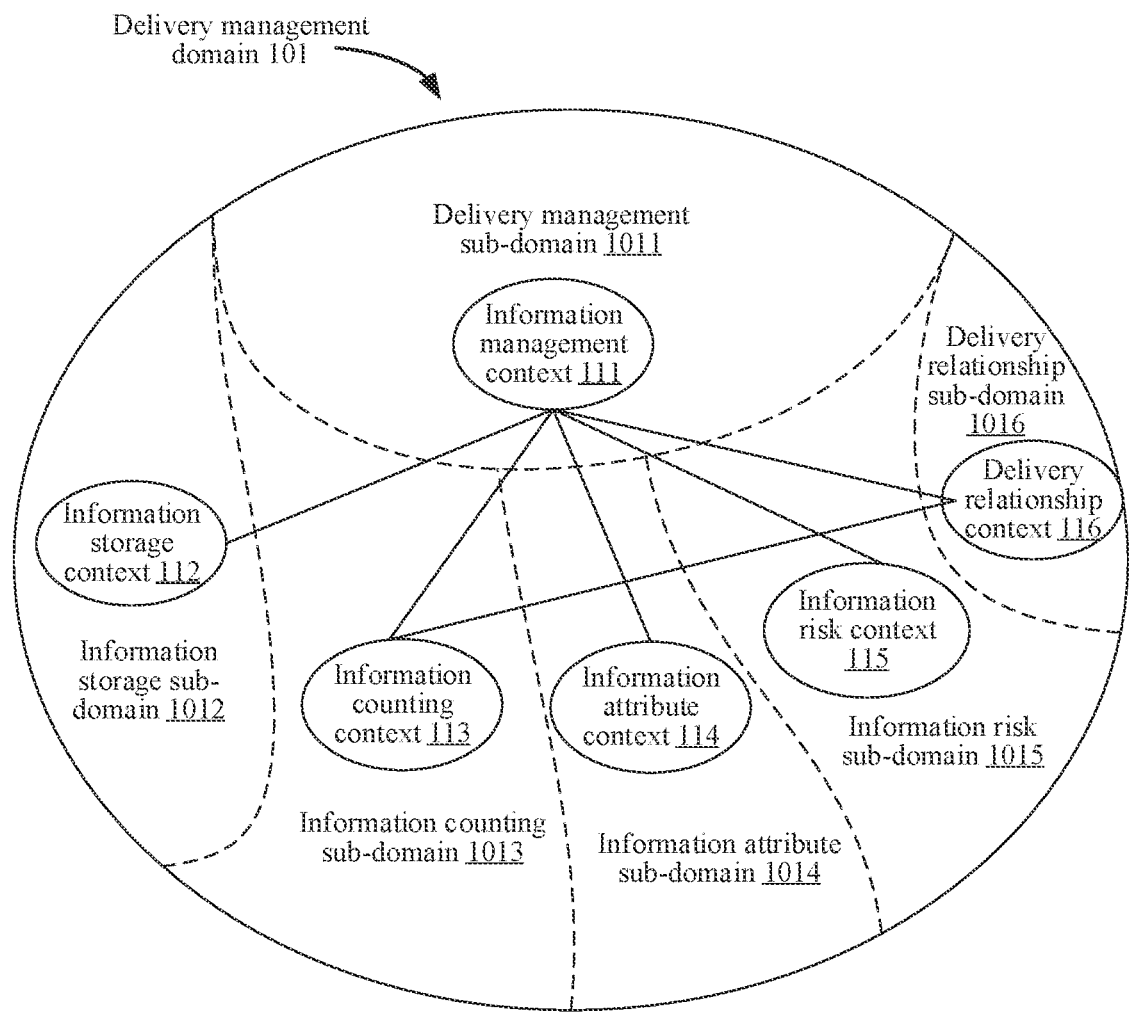
FIG. 11 is a schematic exemplary diagram of a plurality of management contexts according to an embodiment of this application.

For example, referring to FIG. 11, based on FIG. 10, FIG. 11 is a schematic exemplary diagram of a plurality of management contexts according to an embodiment of this application. As shown in FIG. 11, a delivery management domain 101 includes six information management sub-domains: a delivery management sub-domain 1011, an information storage sub-domain 1012, an information counting sub-domain 1013, an information attribute sub-domain 1014, an information risk sub-domain 1015, and a delivery relationship sub-domain 1016. The information management sub-domains are sequentially corresponding to six management contexts: an information management context 111, an information storage context 112, information counting context 113, an information attribute context 114, an information risk context 115, and a delivery relationship context 116. The information storage context 112, the information counting context 113, the information attribute context 114, the information risk context 115, and the delivery relationship context 116 each have a dependency relationship with the information management context 111, and the information counting context 113 has a dependency relationship with the delivery relationship context 116.

S903: The delivery device analyzes, according to the delivery demand use case, model elements corresponding to each of the plurality of management contexts, to obtain a plurality of management models corresponding to the plurality of management contexts.

In this embodiment of this application, after the delivery device obtains the plurality of management contexts, because the delivery demand use case records application scenarios of information delivery and the plurality of management contexts each represent a service range of each information management sub-domain, corresponding model elements can be obtained from the delivery demand use case according to each management context and the obtained model elements are combined into a management model corresponding to each management context, so that the plurality of management models corresponding to the plurality of management contexts are obtained after obtaining of the model elements of the plurality of management contexts is completed.

S904: The delivery device performs coding based on the plurality of management models, to obtain a delivery management application including an information management sub-module and at least one management sub-module.

Each management model obtains information for the functional modules corresponding to each information management sub-domain. By performing coding using a computer language through the management model, the functional modules corresponding to each information management sub-domain can be obtained. By combining all the obtained functional modules (the information management sub-module and the at least one management sub-module) corresponding to all the information management sub-domains, an application for the delivery device side to deliver information, referred to as the delivery management application herein, is obtained. Moreover, the delivery management application includes the information management sub-module and the at least one management sub-module, the information management sub-module is corresponding to the delivery management sub-domain, and the at least one management sub-module is corresponding to at least one sub-domain (formed by at least one of the information storage sub-domain, the information counting sub-domain, the information attribute sub-domain, the information risk sub-domain, and the delivery relationship sub-domain); and the plurality of management sub-modules are in one-to-one correspondence with the plurality of management models, and the plurality of management sub-modules include the information management sub-modules and the at least one management sub-module.

S905: The delivery device runs the delivery management application to display a delivery management interface.

In this embodiment of this application, after the delivery device obtains the delivery management application, by running the delivery management application, the delivery management interface is displayed, so as to implement the delivery of information on the delivery device side according to the displayed delivery management interface.

In this embodiment of this application, S904 may be implemented through S9041-S9043. In other words, that the delivery device analyzes, according to the delivery demand use case, model elements corresponding to each of the plurality of management contexts, to obtain a plurality of management models corresponding to the plurality of management contexts includes the following steps:

S9041: The delivery device analyzes, according to the delivery demand use case, model elements corresponding to a current management context, to obtain a current management aggregation root, a current management entity, and a current management value object.

In this application embodiment, the model elements corresponding to each management context include an aggregation root, an entity, and a value object. Here, the delivery device obtains the corresponding model elements by using any management context in the plurality of management contexts as the current management context, the aggregation root, the entity, and the value object corresponding to the current management context obtained are sequentially the current management aggregation root, the current management entity, and the current management value object. The current management context is any management context in the plurality of management contexts.

S9042: The delivery device combines the current management aggregation root, the current management entity, and the current management value object into a current management model corresponding to the current management context.

After the delivery device obtains the current management aggregation root, the current management entity, and the current management value object corresponding to the current management context, the current management aggregation root, the current management entity, and the current management value object are combined, and an obtained combination result is the current management model corresponding to the current management context.

S9043: The delivery device obtains the plurality of management models corresponding to the plurality of management contexts after processing of all of the plurality of management contexts is completed.

After the delivery device completes obtaining of the management models corresponding to all of the plurality of management contexts according to the process of obtaining the current management model according to the current management context, the plurality of management models corresponding to the plurality of management contexts are also obtained. The plurality of management models include the current management model.

In this embodiment of this application, when the current management context is the information management context, the current management entity includes a delivery record entity, and the current management value object includes at least one of an information attribute value object, a delivery relationship value object, an information storage value object, an information counting value object, and an information risk value object.

Figure 12:
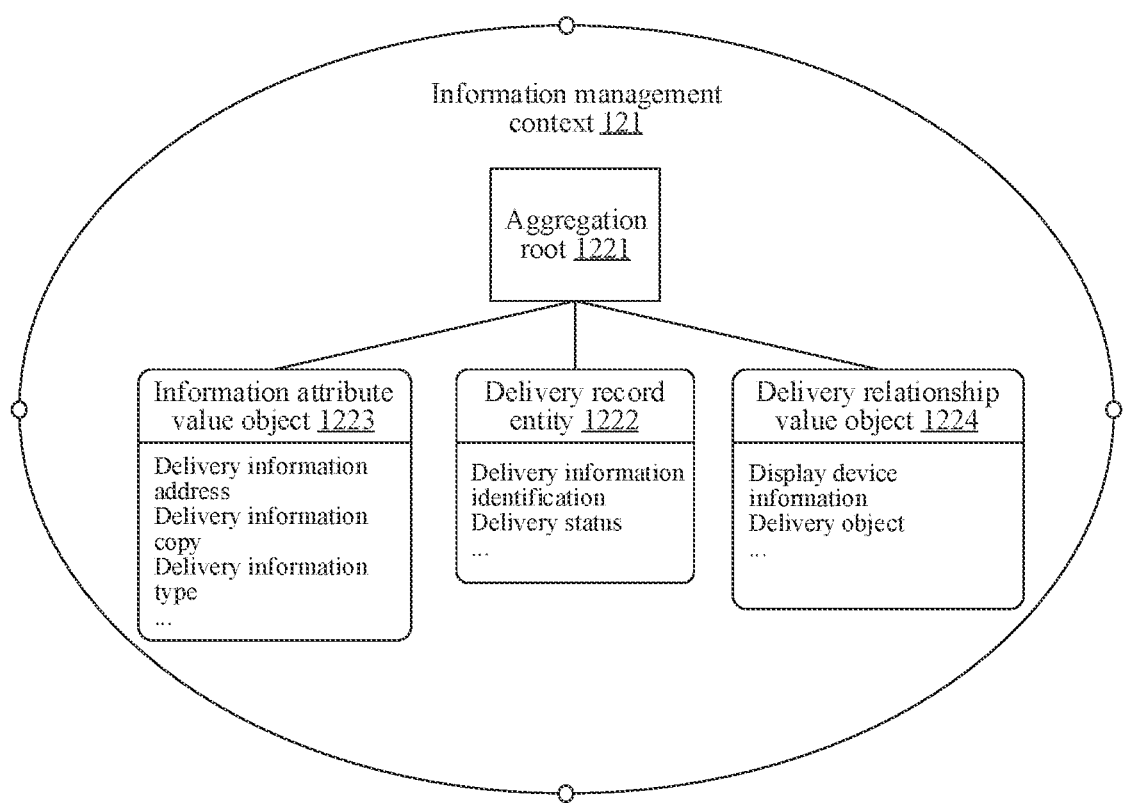
FIG. 12 is a schematic exemplary diagram of a management model corresponding to an information management context according to an embodiment of this application.

For example, FIG. 12 is a schematic exemplary diagram of a management model corresponding to an information management context according to an embodiment of this application. As shown in FIG. 12, a management model corresponding to an information management context 121 includes an aggregation root 1221, a delivery record entity 1222, an information attribute value object 1223, and a delivery relationship value object 1224. In addition, the delivery record entity 1222 includes information such as a delivery information identification and delivery status, the information attribute value object 1223 includes information such as a delivery information address, delivery information copy and a delivery information type, and the delivery relationship value object 1224 includes display device information and a delivery object.

In this embodiment of this application, the current management context includes a current management adaptation layer. The current management adaptation layer is an adaptation layer corresponding to the current management context, and is used for implementing escaping between an external context and a current management context, and provides a unified interface for accessing the external context for the current management context. In this case, S9041 may be implemented through S90411-S90413. In other words, that the delivery device analyzes, according to the delivery demand use case, model elements corresponding to a current management context, to obtain a current management aggregation root, a current management entity, and a current management value object includes S90411-S90413. The following describes the steps.

S90411: The delivery device obtains, according to the delivery demand use case, a self-model element from the current management context.

In this embodiment of this application, during obtaining of a model element corresponding to the current management context by the delivery device according to the delivery demand use case, for the model element, if the delivery device obtains from the current management context a model element from the current management context according to the delivery demand use case, the self-model element is obtained.

S90412: The delivery device obtains, according to the delivery demand use case and a current management adaptation layer, an external model element from an external context.

In this embodiment of this application, during obtaining of a model element corresponding to the current management context by the delivery device according to the delivery demand use case, the model element may be from an external context, and in this case, the delivery device obtains the corresponding information by accessing the external context, and escapes the obtained corresponding information through the current management adaptation layer, so that the external model element is obtained.

Here, the escaping refers to the process of conversion into semantic information needed by the current management context. For example, when a context of a domain queries information of a merchant from an external context through a merchant information adaptation layer, the merchant information adaptation layer translates information of the external context into characteristic information in the context of the present domain. For example, when the information of the merchant queried from the external context includes a plurality of types including A, B, C . . . G and the like and the context in the present domain only needs to know three types of A, B, and other types, the merchant information adaptation layer maps the information of the merchant queried from the external context into semantics in the present domain, thereby ensuring internal unity and simplicity.

The preset external context is a bounded context that is in a different domain (a domain outside the delivery domain) from the current management context. The self-model element and the external model element are the model elements corresponding to the current management context.

S90413: The delivery device obtains the current management aggregation root, the current management entity, and the current management value object from the self-model element and the external model element.

In this application embodiment, the model elements include the self-model element and the external model element.

The current management aggregation root, the current management entity, and the current management value object are obtained by obtaining, by the delivery device, raw and external model elements of a model of the delivery device and extracting an entity and a value object from the self-model element and the external model element.

In this embodiment of this application, S904 may also be implemented through S9044-S9046. In other words, that the delivery device performs coding based on the plurality of management models, to obtain a delivery management application including the information management sub-module and the at least one management sub-module includes S9044-S9046. The following describes the steps.

S9044: The delivery device generates, according to the plurality of management models, creation logic corresponding to each management model.

The model elements are in application scenarios of information delivery, information delivery is implemented by creating model elements. Therefore, during coding by the delivery device according to the management model, the delivery device generates creation logic about model elements for each management model, to implement the delivery of information through the creation logic.

S9045: The delivery device encapsulates the creation logic using a preset design pattern, to obtain a plurality of pieces of optimized creation logic corresponding to the plurality of management models.

In this embodiment of this application, a preset design pattern is set in the delivery device, or the preset design pattern can be obtained, to encapsulate the creation logic of each management model by using the preset design pattern, and the encapsulated creation logic is the optimized creation logic corresponding to each management model. Therefore, there are accordingly a plurality of pieces of optimized creation logic for the plurality of management models. The plurality of management models are in one-to-one correspondence with the plurality of pieces of optimized creation logic.

Here, the preset design pattern is a design pattern, for example, a factory design pattern, an adapter pattern, a prototype pattern, or the like.

S9046: The delivery device performs coding based on the plurality of pieces of optimized creation logic, to obtain the delivery management application including the information management sub-module and the at least one management sub-module.

In this embodiment of this application, after the delivery device obtains the plurality of pieces of optimized creation logic, the coding of the plurality of pieces of optimized creation logic is implemented for different types, so that the delivery management application including the information management sub-module and the at least one management sub-module is obtained.

Figure 13:
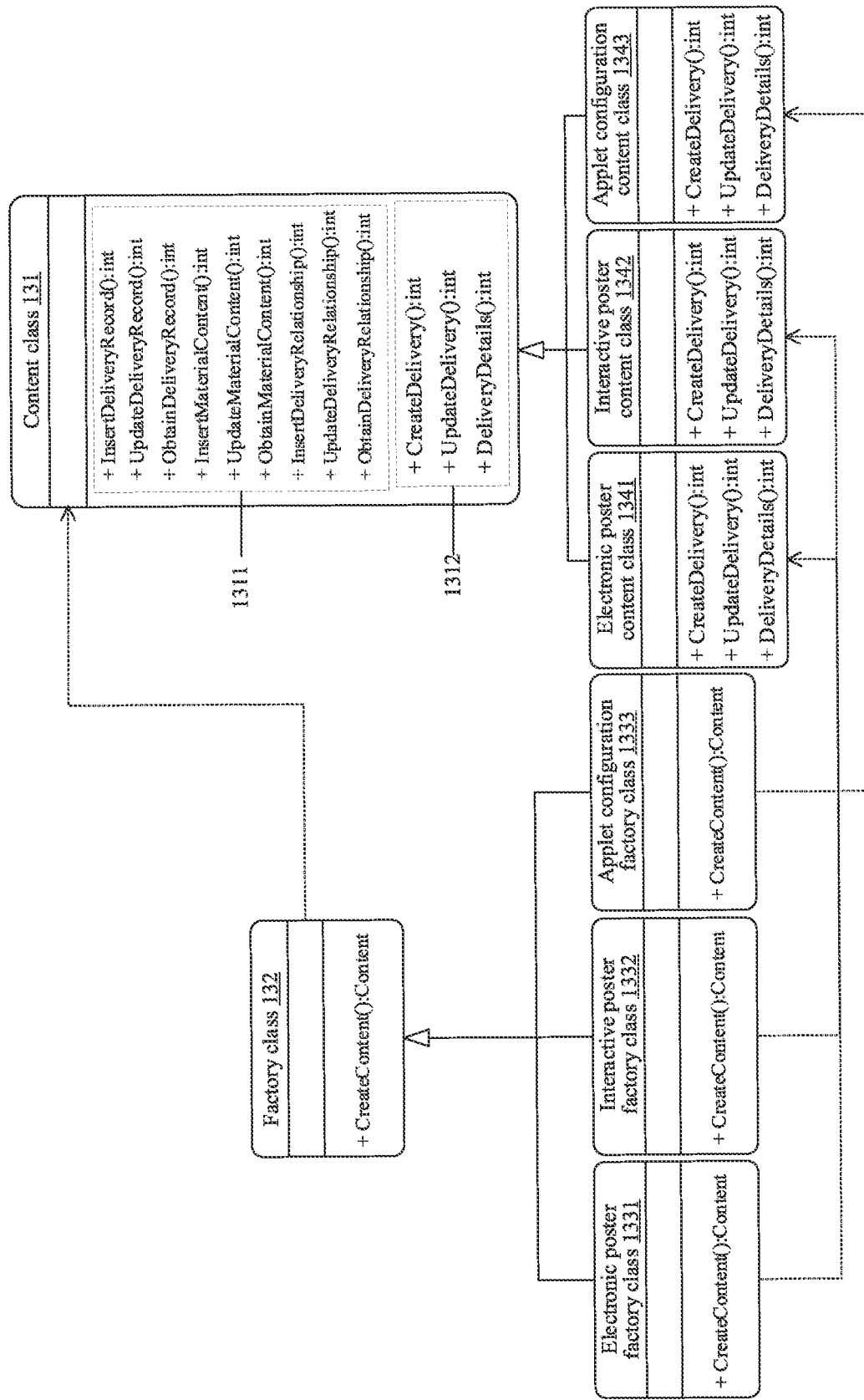
FIG. 13 is a schematic exemplary diagram of encapsulating of creation logic according to an embodiment of this application.

For example, FIG. 13 is a schematic exemplary diagram of encapsulating of creation logic according to an embodiment of this application. As shown in FIG. 13, a content class 131 is information corresponding to the management model shown in FIG. 12, 1311 ("+InsertDelivery Record( ):int", "+UpdateDeliveryRecord( ):int", "+ObtainDeliveryRecord( ):int". "+InsertMaterialContent( ):int" and "+UpdateMaterialContent( ):int", "+ObtainMateriaContent( ):int", "+InsertDeliveryRelationship( ):int", "+UpdateDeliveryRelationship( ):int", and "+ObtainDeliveryRelationship( ):int") in the content class 131 is the creation logic obtained based on FIG. 12, 1312 ("+Create Delivery( ):int", "+UpdateDelivery( ):int" and "+DeliveryDetails( ):int") in the content class 131 is creation logic (an optimized creation logic) obtained after encapsulating the creation logic 1311. When the preset design pattern is the factory pattern, the encapsulated creation logic 1312 is classified and created based on a factory class 132 ("+CreateContent( ):Content") because logic for creating different content may be inconsistent and the required content have different attributes. Here, the encapsulated creation logic is grouped into three classes: an electronic poster factory class 1331 ("+CreateContent( ):Content"), an interactive poster factory class 1332 ("+CreateContent( ):Content"), and an applet configuration factory class 1333 ("+Create Content( ):Content"), corresponding content classes of which are respectively an electronic poster content class 1341 ("+CreateDelivery( ):int", "+UpdateDelivery( ):int", and "+DeliveryDetails( ):int"), an interactive poster content class 1342 ("+CreateDelivery( ):int", "+Update Delivery( ):int", and "+DeliveryDetails( ):int"), and an applet configuration content class 1343 ("+Create Delivery( ):int", "+UpdateDelivery( ):int", and "+DeliveryDetails( ):int"). By encapsulating different creation logic and required parameters, the overall complexity can be simplified. Therefore, the electronic poster content class 1341, the interactive poster content class 1342, and the applet configuration content class 1343 implement creation of different types of content through the encapsulated creation logic 1312.

The creation logic of different delivery information may be different, and the required attributes may also be different. The overall complexity can be simplified by encapsulating different creation logic and required parameters through a preset design pattern.

Figure 14:
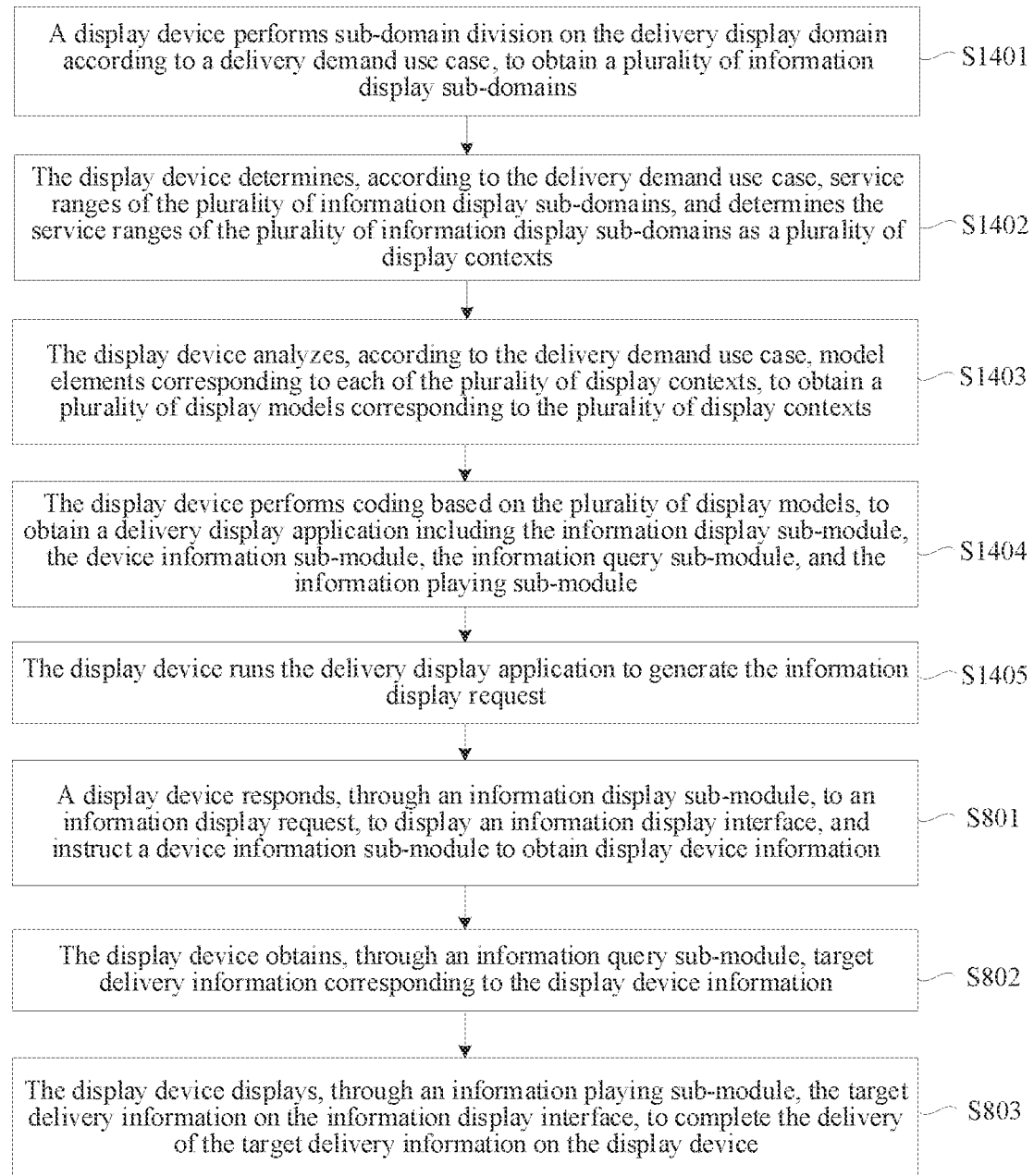
FIG. 14 is another schematic flowchart of an information delivery method according to an embodiment of this application.

In this embodiment of this application, FIG. 14 is another schematic flowchart of an information delivery method according to an embodiment of this application. Referring to FIG. 14, in this embodiment of this application, before S801, the method further includes S1401-S1405. The following describes the steps.

S1401: A display device performs sub-domain division on the delivery display domain according to a delivery demand use case, to obtain a plurality of information display sub-domains.

In this embodiment of this application, before the display device displays the target delivery information, the method further includes a process of obtaining, by the display device based on the domain driven design method, an application for displaying information by using the delivery demand use case. First, for the delivery display domain in the delivery domain, the display device performs sub-domain division according to the delivery demand use case, and the sub-domains obtained after division are the plurality of information display sub-domains.

The plurality of information display sub-domains include a delivery display sub-domain, an information query sub-domain, a device information sub-domain, and an information playing sub-domain. The delivery display sub-domain refers to a core domain for displaying the delivered information, the information query sub-domain refers to a support domain for querying the delivered information, the device information sub-domain refers to a support domain for querying information of the display device, and the information playing sub-domain refers to a support domain for playing the delivered information.

Figure 15:
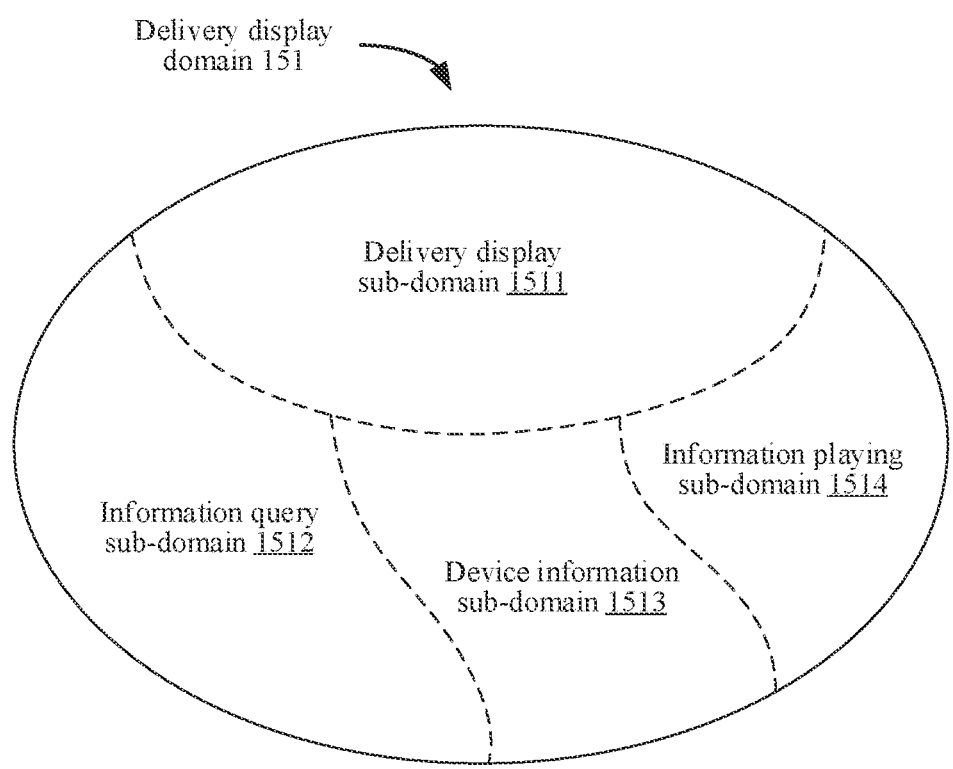
FIG. 15 is a schematic exemplary diagram of a sub-domain division result of a delivery display domain according to an embodiment of this application.

FIG. 15 is a schematic exemplary diagram of a sub-domain division result of a delivery display domain according to an embodiment of this application. As shown in FIG. 15, a delivery display domain 151 includes four information display sub-domains: a delivery display sub-domain 1511, an information query sub-domain 1512, a device information sub-domain 1513, and an information playing sub-domain 1514. In addition, the delivery display sub-domain is 1511 as a core domain, and the information query sub-domain 1512, the device information sub-domain 1513, and the information playing sub-domain 1514 are all support domains for the delivery display sub-domain 1511.

S1402: The display device determines, according to the delivery demand use case, service ranges of the plurality of information display sub-domains, and determines the service ranges of the plurality of information display sub-domains as a plurality of display contexts.

In this embodiment of this application, after the display device obtains the plurality of information display sub-domains, a service range corresponding to each information display sub-domain in the plurality of information display sub-domains is determined according to the delivery demand use case, and a bounded context corresponding to each information display sub-domain is obtained, which is referred to as the display context. Therefore, the plurality of display contexts corresponding to the plurality of information display sub-domains are obtained.

The plurality of display contexts include an information display context, an information query context, a device information context, and an information playing context. In addition, the plurality of display contexts are in one-to-one correspondence with the plurality of information display sub-domains, that is, the information display context is the bounded context of the delivery display sub-domain, the information query context is the bounded context of the information query sub-domain, the device information context is the bounded context of the device information sub-domain, and the information playing context is the bounded context of the information playing sub-domain. Here, because the delivery display sub-domain is the core domain and the information query sub-domain, the device information sub-domain, and the information playing sub-domain are all support domains, the information query context, the device information context, and the information playing context respectively corresponding to the information query sub-domain, the device information sub-domain, and the information playing sub-domain each have a dependency relationship with the information display context of the delivery display sub-domain.

Figure 16:
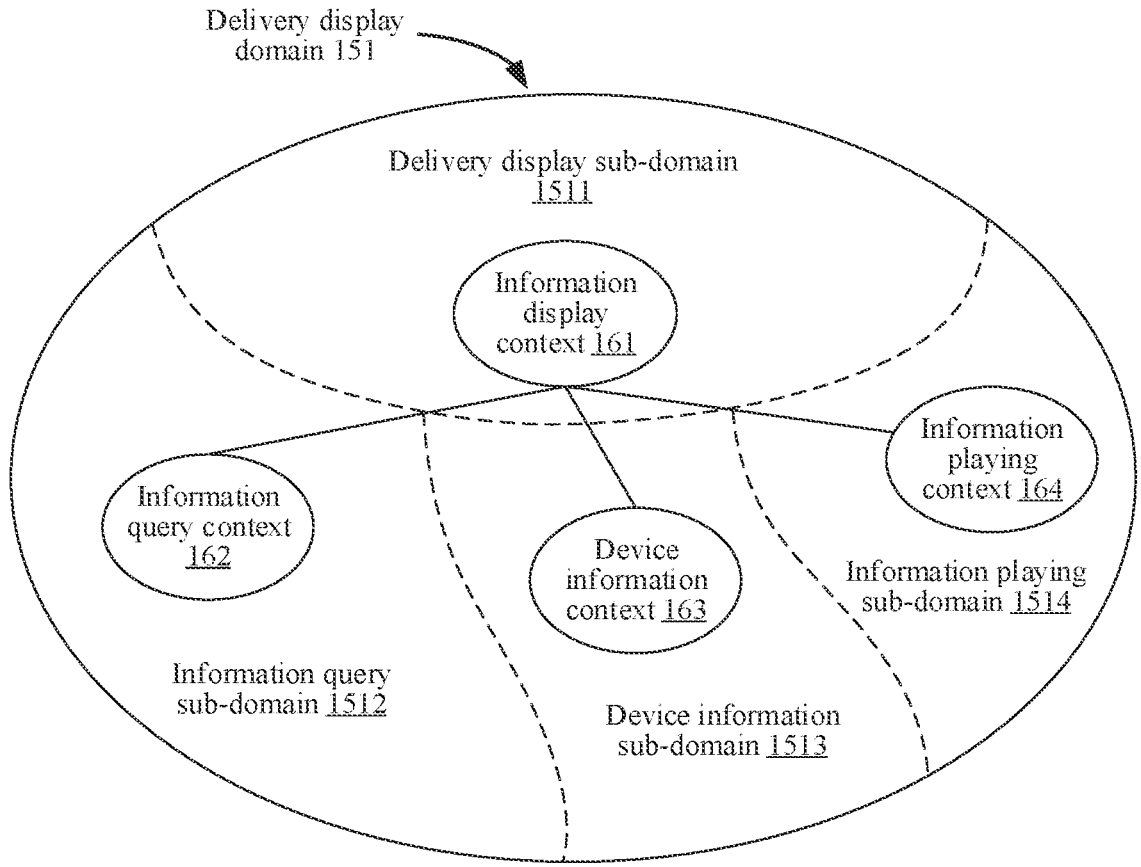
FIG. 16 is a schematic exemplary diagram of a plurality of display contexts according to an embodiment of this application.

For example, referring to FIG. 16, based on FIG. 15, FIG. 16 is a schematic exemplary diagram of a plurality of display contexts according to an embodiment of this application. As shown in FIG. 16, a delivery display domain 151 includes four information display sub-domains: a delivery display sub-domain 1511, an information query sub-domain 1512, a device information sub-domain 1513, and an information playing sub-domain 1514. The four information display sub-domains are respectively corresponding to four display contexts: an information display context 161, an information query context 162, a device information context 163, and an information playing context 164. The information query context 162, the device information context 163, and the information playing context 164 each have a dependency relationship with the information display context 161.

S1403: The display device analyzes, according to the delivery demand use case, model elements corresponding to each of the plurality of display contexts, to obtain a plurality of display models corresponding to the plurality of display contexts.

In this embodiment of this application, after the display device obtains the plurality of display contexts, because the delivery demand use case records application scenarios of information delivery and the plurality of display contexts each represent a service range of each information display sub-domain, corresponding model elements can be obtained from the delivery demand use case according to each display context and the obtained model elements are combined into the display model corresponding to each display context, so that the plurality of display models corresponding to the plurality of display contexts are obtained after obtaining of the model elements of the plurality of display contexts is completed.

S1404: The display device performs coding based on the plurality of display models, to obtain a delivery display application including the information display sub-module, the device information sub-module, the information query sub-module, and the information playing sub-module.

Each display model obtains information for the functional modules corresponding to each information display sub-domain. By performing coding using a computer language through the display model, the functional modules corresponding to each information display sub-domain can be obtained. By combining all the obtained functional modules corresponding to all the information display sub-domains, an application for the display device side to deliver information, referred to as the delivery display application herein, is obtained. In addition, the delivery display application includes the information display sub-module, the device information sub-module, the information query sub-module, and the information playing sub-module, and the information display sub-module is corresponding to the delivery display sub-domain, the device information sub-module is corresponding to the device information sub-domain, the information query sub-module is corresponding to the device information sub-domain, and the information playing sub-module is corresponding to the information playing sub-domain.

S1405: The display device runs the delivery display application to generate the information display request.

In this embodiment of this application, after the display device obtains the delivery display application, by running the delivery display application, an information display request is generated, so as to implement displaying of the delivered information on the display device side according to the generated information display request.

That the display device analyzes, according to the delivery demand use case, model elements corresponding to each of the plurality of display contexts, to obtain a plurality of display models corresponding to the plurality of display contexts in S1403 similarly implements obtaining of a display model by obtaining an aggregation root, an entity, and a value object. In other words, the delivery device analyzes, according to the delivery demand use case, model elements corresponding to a current display context, to obtain a current display aggregation root, a current display entity, and a current display value object, the current display context being any display context in the plurality of display contexts; combines the current display aggregation root, the current display entity, and the current display value object into a current display model corresponding to the current display context; and obtains the plurality of display models corresponding to the plurality of display contexts after processing of all of the plurality of display contexts is completed, the plurality of display models including the current display model.

In addition, that the display device performs coding based on the plurality of display models, to obtain a delivery display application including the information display sub-module, the device information sub-module, the information query sub-module, and the information playing sub-module in S1404 similarly is implemented by using an adaptation layer and a preset design pattern, which are not repeated in this embodiment of this application.

In this embodiment of this application, the information delivery system corresponding to the delivery display application and the delivery management application may be implemented in a waterfall pattern in addition to the implementation by using the DDD described above.

Figure 17:
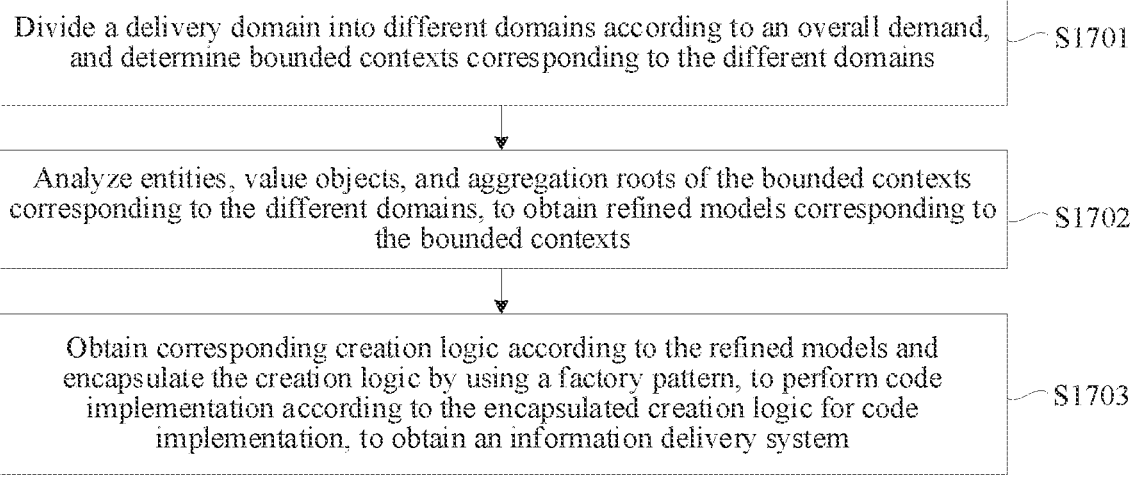
FIG. 17 is a schematic exemplary flowchart of obtaining of an information delivery system according to an embodiment of this application.

The following describes an exemplary application of this embodiment of this application in an actual application scenario. Referring to FIG. 17, during implementation of information delivery by using the DDD, implementation of the information delivery system according to this embodiment of this application according to DDD includes the following steps:

S1701: Divide a delivery domain into different domains according to an overall demand (the delivery demand use case), and determine bounded contexts corresponding to the different domains.

The different domains after division include: a content management domain (the delivery management domain) including a content management sub-domain (the delivery management sub-domain), a content storage sub-domain (the information storage sub-domain), a content counting sub-domain (the information counting sub-domain), a content attribute sub-domain (the information attribute sub-domain), a content risk sub-domain (the information risk sub-domain), and a delivery relationship sub-domain, and a device content display domain (the delivery display domain) including a device content display sub-domain (the delivery display sub-domain), a content query sub-domain (the information query sub-domain), a device information sub-domain, and a content playing sub-domain (the information playing sub-domain). In addition, the content management domain and the device content display domain are two separate domains in the delivery domain. The content management domain: a domain in which a merchant manages content, including viewing, creating, deleting, and the like. The device content display domain: a domain in which content of a merchant is displayed on an IoT device.

In addition, for the content management domain, the content management sub-domain is the core of the entire domain and is supported by five sub-domains in the following:

a content attribute sub-domain: a domain of related attributes such as a unique identification and status;

a delivery relationship sub-domain: a domain of related information about content delivery, such as, being delivered to which devices and which merchants;

a content risk sub-domain: a domain of content created by a merchant and in which there may be some non-compliance situations, which need to be managed;

a content counting sub-domain: a domain for restricting a quantity of items delivered by a merchant; and a content storage sub-domain: a domain in which content, such as a picture or a video, is stored.

For the device content display domain, the device content display sub-domain is the core of the entire domain and is supported by three sub-domains in the following:

a device information sub-domain: a domain for querying information of a current device;

a content query sub-domain: a domain for querying a current device has which pieces of content to deliver; and a content playing sub-domain: a domain for playing delivered content.

Next, bounded contexts corresponding to the different domains are determined by using the service ranges corresponding to the different domains.

S1702: Analyze entities, value objects, and aggregation roots of the bounded contexts corresponding to the different domains, to obtain refined models corresponding to the bounded contexts.

According to the overall demand, the corresponding entity, value object, and aggregation root (the model elements) are analyzed for each bounded context, and the analyzed entity, value object, and aggregation root are combined, to obtain the refined models (the plurality of management models and the plurality of display models) corresponding to the bounded contexts.

S1703: Obtain corresponding creation logic according to the refined models and encapsulate the creation logic by using a factory pattern, to perform code implementation according to the encapsulated creation logic for code implementation, to obtain an information delivery system (the delivery management application and the delivery display application).

Figure 18:
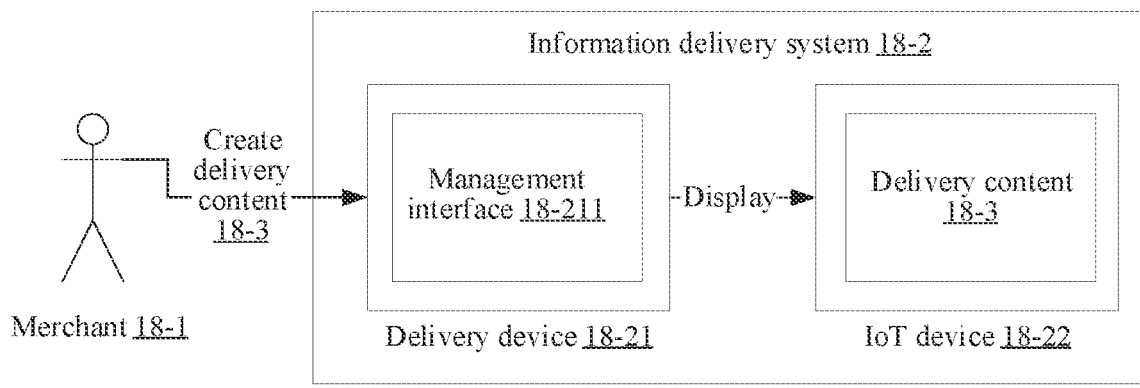
FIG. 18 is an exemplary diagram of an information delivery architecture according to an embodiment of this application.

The following continuously describe an exemplary application for delivering information based on the information delivery system. FIG. 18 is an exemplary diagram of an information delivery architecture according to an embodiment of this application. As shown in FIG. 18, a merchant 18-1 (the delivery object) creates delivery content 18-3 (the target delivery information) through a management interface 18-211 (the delivery management interface) displayed on a delivery device 18-21 in an information delivery system 18-2, to establish an association between the delivery content and an IoT device 18-22 (the display device). Here, the process of creating the content 18-3 is similar to the process of creating the new electronic poster described in FIG. 5, and details are not be repeated in this embodiment of this application. When delivery status of the delivery content 18-3 is set, through the management interface 18-211, to delivering, the delivery content 18-3 is displayed on the IoT device 18-22. In this case, merchant 18-1 completes the delivery of content 18-3 on the IoT device 18-22.

Figure 19:
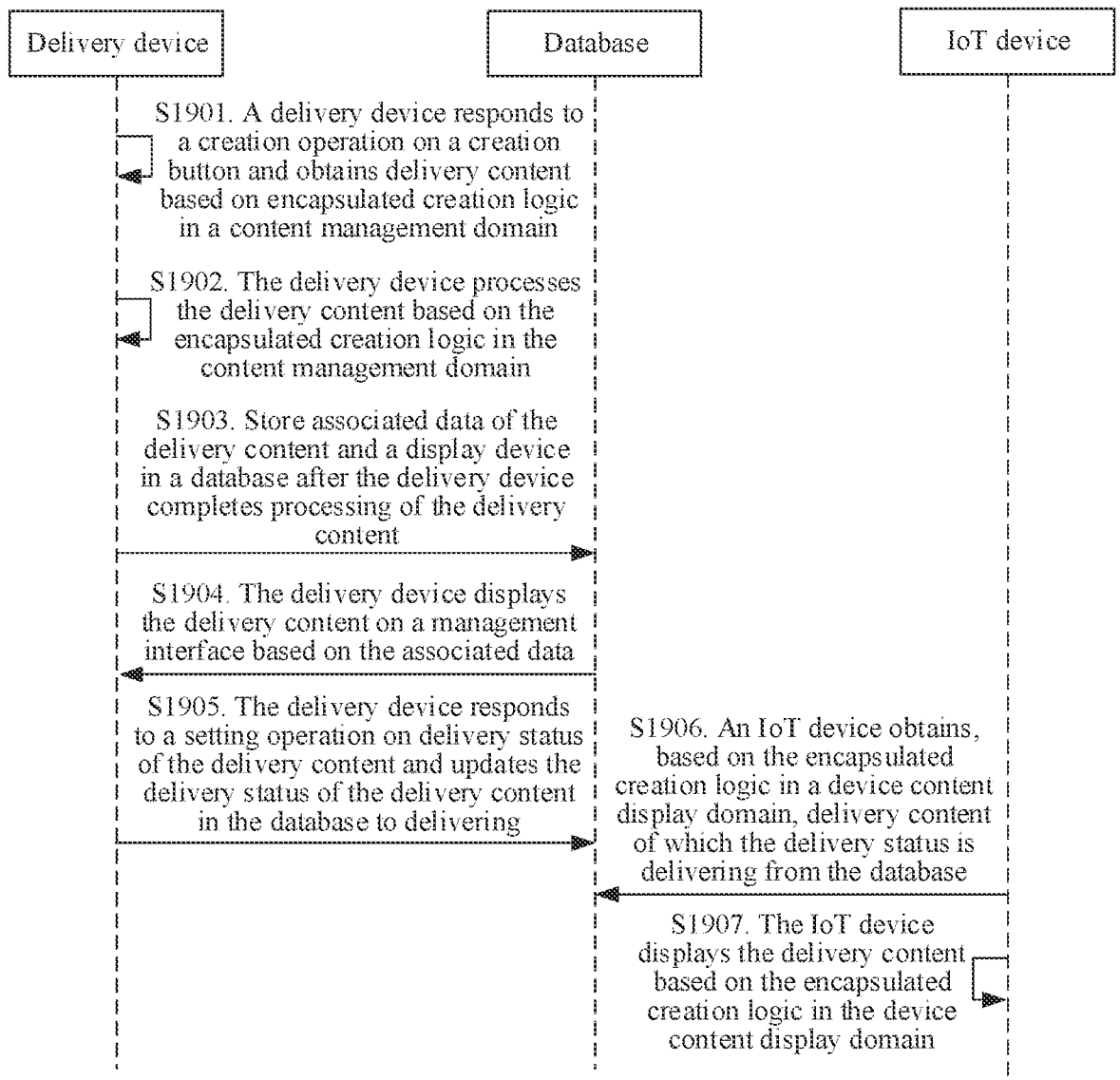
FIG. 19 is an exemplary diagram of information delivery exchange according to an embodiment of this application.

Based on FIG. 18, FIG. 19 is an exemplary diagram of information delivery exchange according to an embodiment of this application. As shown in FIG. 19, the exemplary information delivery process includes the following steps:

S1901: A delivery device responds to a creation operation (the delivery operation) on a creation button (the delivery control) and obtains delivery content (the target delivery information) based on encapsulated creation logic (the information management sub-module) in a content management domain.

S1902: The delivery device processes the delivery content based on the encapsulated creation logic (the at least one management sub-module) in the content management domain.

S1903: Store associated data of the delivery content and a display device in a database after the delivery device completes processing of the delivery content.

S1904: The delivery device displays the delivery content on a management interface based on the associated data.

S1905: The delivery device responds to a setting operation on delivery status of the delivery content and updates the delivery status of the delivery content in the database to delivering.

S1906: An IoT device obtains, based on the encapsulated creation logic (the information display sub-module, the device information sub-module, and the information query sub-module) in a device content display domain, delivery content of which the delivery status is delivering from the database.

S1907: The IoT device displays the delivery content based on the encapsulated creation logic (the information playing sub-module) in the device content display domain.

During information of the information delivery system through the domain driven design method, the degree of coupling of the information delivery system is reduced. The functional modules in the information delivery are independent of each other, with clear responsibilities, and high maintainability. After service logic changes, a total quantity of changes to the information delivery system is small.

The following continuously describe the implementation of exemplary structure of the delivery apparatus 455 provided in the embodiments of this application as a software module. In some embodiments, as shown in FIG. 2, the software module stored in the delivery apparatus 455 of the first memory 450 may include:

an information management sub-module 4551, configured to receive, on a delivery management interface, a delivery operation on a delivery control and respond to the delivery operation, to obtain target delivery information;

a sub-information obtaining module 4552, configured to obtain, according to the target delivery information, at least one piece of management sub-information corresponding to at least one management sub-module, the information management sub-module and the at least one management sub-module being separate modules obtained based on a sub-domain division result of a delivery management domain, and the delivery management domain being a domain for managing delivered information in a delivery domain;

a processing module 4553, configured to process, through the at least one management sub-module, the at least one piece of management sub-information; and an information display module 4554, configured to display, on the delivery management interface, the target delivery information according to a processing result, and instruct, based on the displayed target delivery information, a display device to display the target delivery information according to the separate modules corresponding to a delivery display domain, to complete the delivery of the target delivery information on the display device, the delivery display domain being a domain for displaying the delivered information in the delivery domain.

In this embodiment of this application, the at least one management sub-module includes at least one of an information attribute sub-module, a delivery relationship sub-module, an information risk sub-module, an information counting sub-module, and an information storage sub-module; and the at least one piece of management sub-information includes at least one of a target information attribute, a target delivery relationship, target risk information, target counting limit information, and target storage information.

In this embodiment of this application, the delivery apparatus 455 further includes a management implementation module 4555, configured to perform sub-domain division on the delivery management domain according to a delivery demand use case, to obtain a plurality of information management sub-domains, the delivery demand use case including service knowledge of the delivery domain; determine, according to the delivery demand use case, service ranges of the plurality of information management sub-domains, and determine the service ranges of the plurality of information management sub-domains as a plurality of management contexts; analyze, according to the delivery demand use case, model elements corresponding to each of the plurality of management contexts, to obtain a plurality of management models corresponding to the plurality of management contexts; perform coding based on the plurality of management models, to obtain a delivery management application including the information management sub-module and the at least one management sub-module, the plurality of management sub-modules being corresponding to the plurality of management models, and the plurality of management sub-modules including the information management sub-module and the at least one management sub-module; and run the delivery management application to display the delivery management interface.

In this embodiment of this application, the management implementation module 4555 is further configured to analyze, according to the delivery demand use case, model elements corresponding to a current management context, to obtain a current management aggregation root, a current management entity, and a current management value object, the current management context being any management context in the plurality of management contexts; combine the current management aggregation root, the current management entity, and the current management value object into a current management model corresponding to the current management context; and obtain the plurality of management models corresponding to the plurality of management contexts after processing of all of the plurality of management contexts is completed, the plurality of management models including the current management model.

In this embodiment of this application, the plurality of information management sub-domains include at least one of an information storage sub-domain, an information counting sub-domain, an information attribute sub-domain, an information risk sub-domain, and a delivery relationship sub-domain, and a delivery management sub-domain; the delivery management sub-domain refers to a core domain for managing the delivered information, the information storage sub-domain refers to a support domain for storing the delivered information, the information counting sub-domain refers to a support domain for counting a quantity of pieces of the delivered information, the information attribute sub-domain refers to a support domain corresponding to an attribute of the delivered information, the information risk sub-domain refers to a support domain for determining whether the delivered information satisfies a preset specific condition, and the delivery relationship sub-domain refers to a support domain corresponding to a delivery object and the display device associated with the delivered information; and the plurality of management contexts includes at least one of an information storage context, an information counting context, an information attribute context, an information risk context, and a delivery relationship context, and an information management context.

In this embodiment of this application, when the current management context is the information management context, the current management entity includes a delivery record entity, and the current management value object includes at least one of an information attribute value object, a delivery relationship value object, an information storage value object, an information counting value object, and an information risk value object.

In this embodiment of this application, the current management context includes a current management adaptation layer. The management implementation module 4555 is configured to: obtain, according to the delivery demand use case, a self-model element from the current management context; obtain, according to the delivery demand use case and the current management adaptation layer, an external model element from a preset external context, the self-model element and the external model element being the model elements corresponding to the current management context; and obtain the current management aggregation root, the current management entity, and the current management value object from the self-model element and the external model element.

In this embodiment of this application, the management implementation module 4555 is further configured to generate, according to the plurality of management models, creation logic corresponding to each management model; encapsulate the creation logic using a preset design pattern, to obtain a plurality of pieces of optimized creation logic corresponding to the plurality of management models; and perform coding based on the plurality of pieces of optimized creation logic, to obtain the delivery management application including the information management sub-module and the at least one management sub-module.

The following continuously describe the implementation of exemplary structure of the display apparatus 255 provided in the embodiments of this application as a software module. In some embodiments, as shown in FIG. 3, the software module stored in the display apparatus 255 of the second memory 250 may include:

an information display sub-module 2551, configured to respond to an information display request, to display an information display interface, and instruct a device information sub-module 2552 to obtain display device information;

an information query sub-module 2553, configured to obtain target delivery information corresponding to the display device information, the target delivery information being information delivered by a delivery device according to separate modules corresponding to a delivery management domain, the delivery management domain being a domain for managing delivered information in a delivery domain; and an information playing sub-module 2554, configured to display, on the information display interface, the target delivery information, so as to complete the delivery of the target delivery information on the display device; the information display sub-module 2551, the device information sub-module 2552, the information query sub-module 2553, and the information playing sub-module 2554 being separate modules obtained based on a sub-domain division result of a delivery display domain, and the delivery display domain being a domain for displaying the delivered information in the delivery domain.

In this embodiment of this application, the display apparatus 255 further includes a display implementation module 2555, configured to: perform sub-domain division on the delivery display domain according to a delivery demand use case, to obtain a plurality of information display sub-domains, the delivery demand use case including service knowledge of the delivery domain; determine, according to the delivery demand use case, service ranges of the plurality of information display sub-domains, and determine the service ranges of the plurality of information display sub-domains as a plurality of display contexts; analyze, according to the delivery demand use case, model elements corresponding to each of the plurality of display contexts, to obtain a plurality of display models corresponding to the plurality of display contexts; perform coding based on the plurality of display models, to obtain a delivery display application including the information display sub-module, the device information sub-module, the information query sub-module, and the information playing sub-module; and run the delivery display application to generate the information display request.

In this embodiment of this application, the plurality of information display sub-domains include a delivery display sub-domain, an information query sub-domain, a device information sub-domain, and an information playing sub-domain; the delivery display sub-domain refers to a core domain for displaying the delivered information, the information query sub-domain refers to a support domain for querying the delivered information, the device information sub-domain refers to a support domain for querying information of a device to which delivery is directed, and the information playing sub-domain refers to a support domain for playing the delivered information; and the plurality of display contexts include an information display context, an information query context, a device information context, and an information playing context.

In this embodiment of this application, the display implementation module 2555 is further configured to: analyze, according to the delivery demand use case, model elements corresponding to a current display context, to obtain a current display aggregation root, a current display entity, and a current display value object, the current display context being any display context in the plurality of display contexts; combine the current display aggregation root, the current display entity, and the current display value object into a current display model corresponding to the current display context; and obtain the plurality of display models corresponding to the plurality of display contexts after processing of all of the plurality of display contexts is completed, the plurality of display models including the current display model.

An embodiment of this application further provides a computer-readable storage medium, storing executable instructions, and the executable instructions, when executed by a first processor, causing the first processor to implement the information delivery method applied to a delivery device provided in the embodiments of this application, for example, the information delivery method shown in FIG. 4; or when executed by a second processor, causing the second processor to implement the information delivery method applied to a display device provided in the embodiments of this application, for example, the information delivery method shown in FIG. 8A.

In some embodiments, the computer-readable storage medium may be a memory such as a ferroelectric RAM (FRAM), a ROM, a programmable ROM (PROM), an electrically programmable ROM (EPROM), an electrically erasable PROM (EEPROM), a flash memory, a magnetic surface memory, an optical disk, or a CD-ROM, or may be any device including one of or any combination of the foregoing memories.

In some embodiments, the executable instructions can be written in a form of a program, software, a software module, a script, or code and according to a programming language (including a compiler or interpreter language or a declarative or procedural language) in any form, and may be deployed in any form, including an independent program or a module, a component, a subroutine, or another unit suitable for use in a computing environment.

In an example, the executable instructions may, but do not necessarily, correspond to a file in a file system, and may be stored in a part of a file that saves another program or other data, for example, be stored in one or more scripts in a hypertext markup language (HTML) file, stored in a file that is specially used for a program in discussion, or stored in the plurality of collaborative files (for example, be stored in files of one or modules, subprograms, or code parts).

In an example, the executable instructions can be deployed for execution on one computing device, execution on a plurality of computing devices located at one location, or execution on a plurality of computing devices that are distributed at a plurality of locations and that are interconnected through a communication network.

To sum up, through the embodiments of this application, during delivery of target delivery information, the delivery device processes the target delivery information according to separate modules of a delivery management domain, so as to complete the delivery of the target delivery information in the delivery device, and then the display device displays the target delivery information according to the separate modules corresponding to the delivery display domain. Moreover, because the separate modules of the delivery management domain are obtained based on a sub-domain division result of the delivery management domain and the separate modules corresponding to the delivery display domain are obtained based on the sub-domain division result of the delivery display domain, the coupling degree of functional modules configured to display the target delivery information is low, thereby simplifying the process of information delivery, improving the efficiency of the information delivery, and reducing the complexity of the information delivery.

The foregoing descriptions are merely embodiments of this application and are not intended to limit the protection scope of this application. Any modification, equivalent replacement, or improvement made without departing from the spirit and range of this application shall fall within the protection scope of this application.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs delivery management and/or delivery display. In practical application, the foregoing functions may be allocated to and completed by different functional modules according to requirements, that is, an inner structure of a device is divided into different functional modules to implement all or a part of the functions described above.

What is claimed is:

1. An information delivery method, performed by an information delivery system including a server, a first computer device having a delivery management interface, and a second computer device having an information display interface, the method comprising:
    performing sub-domain division on a delivery management domain of the information delivery system according to a delivery demand use case, to obtain a plurality of information management sub-domains, the delivery demand use case comprising service knowledge of the delivery management domain;
    determining, according to the delivery demand use case, service ranges of the plurality of information management sub-domains as a plurality of management contexts;
    analyzing, according to the delivery demand use case, model elements corresponding to each of the plurality of management contexts, to obtain a plurality of management models corresponding to the plurality of management contexts;
    constructing a delivery management application comprising a plurality of management sub-modules corresponding to the plurality of management models;
    running, at the first client device, the delivery management application to display the delivery management interface;
    receiving, at the first computer device, a delivery operation on the delivery management interface;
    in response to the delivery operation, generating, at the first computer device, target delivery information based on user inputs via the delivery management interface and transmitting the target delivery information to the server, wherein the target delivery information is an electronic poster;
    obtaining, at the server, the target delivery information via an information management sub-module, wherein the target delivery information includes information content, delivery type, delivery batch number, delivery time, and delivery status of the electronic poster;
    obtaining, at the server, according to the target delivery information, (i) an information attribute sub-module, (ii) a delivery relationship sub-module, (iii) an information risk sub-module, (iv) an information counting sub-module, and (v) an information storage sub-module from the plurality of management sub-modules corresponding to the plurality of management models, wherein the information attribute sub-module, the delivery relationship sub-module, the information risk sub-module, the information counting sub-module, the information storage sub-module and the at least one management sub-module are distinct modules of a delivery management domain, and the delivery management domain is a first domain of a delivery domain associated with the information delivery system and manages delivered information;
    processing, at the server, the target delivery information by having the information attribute sub-module, the delivery relationship sub-module, the information risk sub-module, the information counting sub-module, the information storage sub-module processing the information content, the delivery type, the delivery batch number, the delivery time, and the delivery status of the electronic poster to obtain a target delivery object corresponding to the electronic poster;
    receiving, at the server, an information display request transmitted by the second computer device; and
    based on the information display request, transmitting, by the server, the target delivery object to the second computer device and causing the second computer device to display the electronic poster on the information display interface according to separate modules corresponding to a delivery display domain, wherein the delivery display domain is a second domain of the delivery domain and displays the delivered information, and the delivery display domain is independent from the delivery management domain.

2. The method according to claim 1, wherein analyzing the model elements comprises:
    analyzing, according to the delivery demand use case, model elements corresponding to a current management context, to obtain a current management aggregation root, a current management entity, and a current management value object, the current management context being any management context in the plurality of management contexts;
    combining the current management aggregation root, the current management entity, and the current management value object into a current management model corresponding to the current management context; and
    obtaining the plurality of management models corresponding to the plurality of management contexts after processing of all of the plurality of management contexts is completed, the plurality of management models comprising the current management model.

3. The method according to claim 2, wherein the plurality of information management sub-domains comprise at least one of an information storage sub-domain, an information counting sub-domain, an information attribute sub-domain, an information risk sub-domain, and a delivery relationship sub-domain, and a delivery management sub-domain;
    the delivery management sub-domain refers to a core domain for managing the delivered information, the information storage sub-domain refers to a support domain for storing the delivered information, the information counting sub-domain refers to a support domain for counting a quantity of pieces of the delivered information, the information attribute sub-domain refers to a support domain corresponding to an attribute of the delivered information, the information risk sub-domain refers to a support domain for determining whether the delivered information satisfies a preset specific condition, and the delivery relationship sub-domain refers to a support domain corresponding to a delivery object and the display device associated with the delivered information; and
    the plurality of management contexts comprise at least one of an information storage context, an information counting context, an information attribute context, an information risk context, and a delivery relationship context, and an information management context.

4. The method according to claim 3, wherein when the current management context is the information management context, the current management entity comprises a delivery record entity, and the current management value object comprises at least one of an information attribute value object, a delivery relationship value object, an information storage value object, an information counting value object, and an information risk value object.

5. The method according to claim 2, wherein the current management context comprises a current management adaptation layer; and
analyzing the model elements comprises:
obtaining, according to the delivery demand use case, a self-model element from the current management context;
obtaining, according to the delivery demand use case and the current management adaptation layer, an external model element from a preset external context, the self-model element and the external model element being the model elements corresponding to the current management context; and
obtaining the current management aggregation root, the current management entity, and the current management value object from the self-model element and the external model element.

6. The method according to claim 1, wherein performing the coding comprises:
generating, according to the plurality of management models, creation logic corresponding to each management model;
encapsulating the creation logic using a preset design pattern, to obtain a plurality of pieces of optimized creation logic corresponding to the plurality of management models; and
performing coding based on the plurality of pieces of optimized creation logic, to obtain the delivery management application comprising the information management sub-module and the at least one management sub-module.

7. An information delivery system comprising a server, a first computer device having a delivery management interface, and a second computer device having an information display interface, each comprising:
one or more processors; and
memory storing one or more programs, the one or more programs comprising instructions that, when executed by the one or more processors, cause the one or more processors to perform operations comprising:
performing sub-domain division on a delivery management domain of the information delivery system according to a delivery demand use case, to obtain a plurality of information management sub-domains, the delivery demand use case comprising service knowledge of the delivery management domain;
determining, according to the delivery demand use case, service ranges of the plurality of information management sub-domains as a plurality of management contexts;
analyzing, according to the delivery demand use case, model elements corresponding to each of the plurality of management contexts, to obtain a plurality of management models corresponding to the plurality of management contexts;
constructing a delivery management application comprising a plurality of management sub-modules corresponding to the plurality of management models;
running, at the first client device, the delivery management application to display the delivery management interface;
receiving, at the first computer device, a delivery operation on the delivery management interface;
in response to the delivery operation, generating, at the first computer device, target delivery information based on user inputs via the delivery management interface and transmitting the target delivery information to the server, wherein the target delivery information is an electronic poster;
obtaining, at the server, the target delivery information via an information management sub-module, wherein the target delivery information includes information content, delivery type, delivery batch number, delivery time, and delivery status of the electronic poster;
obtaining, at the server, according to the target delivery information, (i) an information attribute sub-module, (ii) a delivery relationship sub-module, (iii) an information risk sub-module, (iv) an information counting sub-module, and (v) an information storage sub-module from the plurality of management sub-modules corresponding to the plurality of management models, wherein the information attribute sub-module, the delivery relationship sub-module, the information risk sub-module, the information counting sub-module, the information storage sub-module and the at least one management sub-module are distinct modules of a delivery management domain, and the delivery management domain is a first domain of a delivery domain associated with the information delivery system and manages delivered information;
processing, at the server, the target delivery information by having the information attribute sub-module, the delivery relationship sub-module, the information risk sub-module, the information counting sub-module, the information storage sub-module processing the information content, the delivery type, the delivery batch number, the delivery time, and the delivery status of the electronic poster to obtain a target delivery object corresponding to the electronic poster;
receiving, at the server, an information display request transmitted by the second computer device; and
based on the information display request, transmitting, by the server, the target delivery object to the second computer device and causing the second computer device to display the electronic poster on the information display interface according to separate modules corresponding to a delivery display domain, wherein the delivery display domain is a second domain of the delivery domain and displays the delivered information, and the delivery display domain is independent from the delivery management domain.

8. The information delivery system according to claim 7, wherein analyzing the model elements comprises:
analyzing, according to the delivery demand use case, model elements corresponding to a current management context, to obtain a current management aggregation root, a current management entity, and a current management value object, the current management context being any management context in the plurality of management contexts;
combining the current management aggregation root, the current management entity, and the current management value object into a current management model corresponding to the current management context; and
obtaining the plurality of management models corresponding to the plurality of management contexts after processing of all of the plurality of management contexts is completed, the plurality of management models comprising the current management model.

9. The information delivery system according to claim 8, wherein the plurality of information management sub-domains comprise at least one of an information storage sub-domain, an information counting sub-domain, an information attribute sub-domain, an information risk sub-domain, and a delivery relationship sub-domain, and a delivery management sub-domain;

the delivery management sub-domain refers to a core domain for managing the delivered information, the information storage sub-domain refers to a support domain for storing the delivered information, the information counting sub-domain refers to a support domain for counting a quantity of pieces of the delivered information, the information attribute sub-domain refers to a support domain corresponding to an attribute of the delivered information, the information risk sub-domain refers to a support domain for determining whether the delivered information satisfies a preset specific condition, and the delivery relationship sub-domain refers to a support domain corresponding to a delivery object and the display device associated with the delivered information; and the plurality of management contexts comprise at least one of an information storage context, an information counting context, an information attribute context, an information risk context, and a delivery relationship context, and an information management context.

10. The information delivery system according to claim 9, wherein when the current management context is the information management context, the current management entity comprises a delivery record entity, and the current management value object comprises at least one of an information attribute value object, a delivery relationship value object, an information storage value object, an information counting value object, and an information risk value object.

11. The information delivery system according to claim 8, wherein the current management context comprises a current management adaptation layer; and analyzing the model elements comprises:
  obtaining, according to the delivery demand use case, a self-model element from the current management context;
  obtaining, according to the delivery demand use case and the current management adaptation layer, an external model element from a preset external context, the self-model element and the external model element being the model elements corresponding to the current management context; and
  obtaining the current management aggregation root, the current management entity, and the current management value object from the self-model element and the external model element.

12. The information delivery system according to claim 7, wherein performing the coding comprises:
  generating, according to the plurality of management models, creation logic corresponding to each management model;
  encapsulating the creation logic using a preset design pattern, to obtain a plurality of pieces of optimized creation logic corresponding to the plurality of management models; and
  performing coding based on the plurality of pieces of optimized creation logic, to obtain the delivery management application comprising the information management sub-module and the at least one management sub-module.

13. A non-transitory computer-readable storage medium, storing a plurality of computer programs, the computer programs, when executed by one or more processors of an information delivery system including a server, a first computer device having a delivery management interface, and a second computer device having an information display interface, cause the one or more processors to perform operations comprising:

performing sub-domain division on a delivery management domain of the information delivery system according to a delivery demand use case, to obtain a plurality of information management sub-domains, the delivery demand use case comprising service knowledge of the delivery management domain;

determining, according to the delivery demand use case, service ranges of the plurality of information management sub-domains as a plurality of management contexts;

analyzing, according to the delivery demand use case, model elements corresponding to each of the plurality of management contexts, to obtain a plurality of management models corresponding to the plurality of management contexts;

constructing a delivery management application comprising a plurality of management sub-modules corresponding to the plurality of management models;

running, at the first client device, the delivery management application to display the delivery management interface;

receiving, at the first computer device, a delivery operation on the delivery management interface;

in response to the delivery operation, generating, at the first computer device, target delivery information based on user inputs via the delivery management interface and transmitting the target delivery information to the server, wherein the target delivery information is an electronic poster;

obtaining, at the server, the target delivery information via an information management sub-module, wherein the target delivery information includes information content, delivery type, delivery batch number, delivery time, and delivery status of the electronic poster;

obtaining, at the server, according to the target delivery information, (i) an information attribute sub-module, (ii) a delivery relationship sub-module, (iii) an information risk sub-module, (iv) an information counting sub-module, and (v) an information storage sub-module from the plurality of management sub-modules corresponding to the plurality of management models, wherein the information attribute sub-module, the delivery relationship sub-module, the information risk sub-module, the information counting sub-module, the information storage sub-module and the at least one management sub-module are distinct modules of a delivery management domain, and the delivery management domain is a first domain of a delivery domain associated with the information delivery system and manages delivered information;

processing, at the server, the target delivery information by having the information attribute sub-module, the delivery relationship sub-module, the information risk sub-module, the information counting sub-module, the information storage sub-module processing the information content, the delivery type, the delivery batch number, the delivery time, and the delivery status of the electronic poster to obtain a target delivery object corresponding to the electronic poster;

receiving, at the server, an information display request transmitted by the second computer device; and based on the information display request, transmitting, by the server, the target delivery object to the second computer device and causing the second computer device to display the electronic poster on the information display interface according to separate modules corresponding to a delivery display domain, wherein the delivery display domain is a second domain of the delivery domain and displays the delivered information, and the delivery display domain is independent from the delivery management domain.

14. The non-transitory computer-readable storage medium according to claim 13, wherein analyzing the model elements comprises:

analyzing, according to the delivery demand use case, model elements corresponding to a current management context, to obtain a current management aggregation root, a current management entity, and a current management value object, the current management context being any management context in the plurality of management contexts;

combining the current management aggregation root, the current management entity, and the current management value object into a current management model corresponding to the current management context; and obtaining the plurality of management models corresponding to the plurality of management contexts after processing of all of the plurality of management contexts is completed, the plurality of management models comprising the current.

* * * * *